US010546377B2

(12) United States Patent
Ishikawa et al.

(10) Patent No.: US 10,546,377 B2
(45) Date of Patent: Jan. 28, 2020

(54) IMAGE PROCESSING APPARATUS AND METHOD, AND PROCESSING SYSTEM

(71) Applicant: CANON KABUSHIKI KAISHA, Tokyo (JP)

(72) Inventors: Ryo Ishikawa, Kawasaki (JP); Hiroyuki Yamamoto, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 4 days.

(21) Appl. No.: 15/668,813

(22) Filed: Aug. 4, 2017

(65) Prior Publication Data
US 2017/0358080 A1 Dec. 14, 2017

Related U.S. Application Data

(63) Continuation of application No. 13/938,564, filed on Jul. 10, 2013, now Pat. No. 9,767,549.

(30) Foreign Application Priority Data

Jul. 17, 2012 (JP) .................................. 2012-159079

(51) Int. Cl.
G06K 9/00 (2006.01)
G06T 7/00 (2017.01)

(52) U.S. Cl.
CPC .......... *G06T 7/0012* (2013.01); *G06T 7/0016* (2013.01); *G06T 2207/10072* (2013.01); *G06T 2207/30068* (2013.01)

(58) Field of Classification Search
CPC ......... G06T 7/0012; G06T 2207/10072; G06T 2207/30068; G06T 7/0016; A45D 2200/1009; A45D 2200/1018; A45D 34/04
See application file for complete search history.

(56) References Cited

U.S. PATENT DOCUMENTS 8,345,927 B2    1/2013  Ishikawa et al. ............. 382/106
8,977,018 B2 *  3/2015  Buelow ................. G06T 7/0032
                                                  382/128
(Continued)

FOREIGN PATENT DOCUMENTS

JP    2006-175057    7/2006
JP    2011-125570    6/2011
(Continued)

OTHER PUBLICATIONS

T. Carter et al., "MR Navigated Breast Surgery: Method and Initial Clinical Experience", *Medical Image Computer and Computer-Assisted Intervention*, Part II, Lecture Notes in Computer Science, vol. 5242, pp. 356-363, Springer Berlin Heidelberg (2008).

(Continued)

*Primary Examiner* — Tom Y Lu
(74) *Attorney, Agent, or Firm* — Venable LLP

(57) ABSTRACT

An image processing apparatus obtains, for each of a plurality of subjects, a data set including first shape data which indicates a shape of a subject measured in association with the subject in a first state, and second shape data which indicates a shape of the subject measured in association with the subject in a second state, obtains basis data required to express a deformation from the first state to the second state, based on the data sets for the plurality of subjects, and estimates, based on the generated basis data and data indicating a shape of a target subject measured in association with the target subject in the first state, a deformation from the first state to the second state in association with the target subject.

22 Claims, 15 Drawing Sheets

(56) References Cited

U.S. PATENT DOCUMENTS

| | | | |
|---|---|---|---|
| 9,558,549 B2 | 1/2017 | Ishikawa et al. | 382/130 |
| 9,767,549 B2* | 9/2017 | Ishikawa | G06T 7/0012 |
| 2010/0074488 A1 | 3/2010 | Ishikawa et al. | 382/128 |
| 2011/0150310 A1 | 6/2011 | Endo et al. | 382/131 |
| 2011/0246129 A1 | 10/2011 | Ishikawa et al. | 702/150 |
| 2011/0262015 A1 | 10/2011 | Ishikawa et al. | 382/128 |
| 2012/0207368 A1* | 8/2012 | Ishikawa | G06T 7/0032 |
| | | | 382/128 |
| 2012/0262460 A1 | 10/2012 | Endo et al. | 345/441 |

FOREIGN PATENT DOCUMENTS

| | | |
|---|---|---|
| JP | 2011-254121 | 12/2011 |
| WO | WO 2011/052515 | 5/2011 |

OTHER PUBLICATIONS

Y. Hu et al., "A Statistical Motion Model Based on Biomechanical Simulations for Data Fusion during Image-Guided Prostate Interventions", *Medical Image Computer and Computer-Assisted Intervention*, Lecture Notes in Computer Science, vol. 5241, pp. 737-744, Springer Berlin Heidelberg (2008).

W. Cheng et al., "N-Sift: N-Dimensional Scale Invariant Feature Transform for Matching Medical Images", *International Symposium on Biomedical Imaging: From Nano to Macro*, pp. 720-723 (2007).

\* cited by examiner

PRONE IMAGE

PRONE IMAGE

SAGITTAL PLANE

AXIAL PLANE

IMAGE PROCESSING APPARATUS AND METHOD, AND PROCESSING SYSTEM

RELATED APPLICATIONS

This application is a continuation of application Ser. No. 13/938,564, filed Jul. 10, 2013. It claims benefit of that application under 35 U.S.C. § 120, and claims benefit under 35 U.S.C. § 119 of Japanese Patent Application No. 2012-159079, filed on Jul. 17, 2012. The entire contents of each of the mentioned prior applications are incorporated herein by reference.

BACKGROUND OF THE INVENTION

Field of the Invention

The present invention relates to an image processing apparatus and method suitable for medical images captured by various medical image collection apparatuses (modalities) such as an MRI (Magnetic Resonance Imaging) apparatus, X-ray CT (X-ray Computed Tomography) apparatus, and US (ultrasonic image diagnosis) apparatus.

Description of the Related Art

In a medical field, when an area of interest is found on an image of a certain modality, an area corresponding to that area of interest (corresponding area) is identified on an image of another modality, and diagnosis is often given by comparing the two areas. When these modalities capture images to have the same body position, these areas can be easily identified and compared. However, when these modalities capture images to have different body positions, since shapes of subjects are different at capturing timings, it becomes difficult to identify and compare the areas. Hence, an attempt is made to estimate deformations of both the subject (that is, to do deformable image alignment). Then, it becomes possible to estimate a position of the corresponding area based on position information of the area of interest, and to apply deformation to one image to generate an image having the same shape as that of the other image.

For example, Reference 1 (T. Carter, C. Tanner, N. Beechey-Newman, D. Barratt and D. Hawkes, "MR navigated breast surgery: Method and initial clinical experience," MICCAI2008) discloses a technique for aligning and displaying an MRI image captured at a prone position and an ultrasonic image captured at a supine position. More specifically, a finite element model (FEM) is generated based on the MRI image captured at the prone position, and a deformation simulation from the prone position to the supine position is executed using this model. Then, based on this simulation result, the MRI image captured at the prone position, a lesion area drawn in the MRI image, and the like are superimposed on the ultrasonic image at the supine position. Using this display, position differences caused by the deformation between the prone position and supine position can be corrected.

Also, Reference 2 (Y. Hu, D. Morgan, H. Ahmed, D. Pendse, M. Sahu, C. Allen, M. Emberton and D. Hawkes, "A Statistical Motion Model Based on Biomechanical Simulations," MICCAI2008) discloses a technique which can cope with a case in which material characteristics and border conditions of a target are not clear by executing a deformation simulation using a finite element model. More specifically, deformation simulations are executed in advance under the assumption of various material characteristics and border conditions, and a model which expresses a deformation of the target using a relatively small number of coefficients is generated from a group obtained as a result of the simulations. Then, a deformation of the target is estimated using that model.

When the technique described in Reference 1 is used, deformation estimation with high precision between the prone position and supine position can be expected. However, since the deformation simulation is required to be repetitively executed, the deformation estimation processing requires much time. On the other hand, when the technique described in Reference 2 is used, the deformation estimation processing time can be shortened. However, a finite element model has to be generated in association with a target case, and that operation is troublesome.

SUMMARY OF THE INVENTION

The present invention has been made in consideration of the above problems, and provides a mechanism which can quickly and easily align between a plurality of medical images having different deformation states.

According to one aspect of the present invention, there is provided an imaging processing apparatus which comprises: an obtaining unit configured to obtain, for each of a plurality of subjects, a data set including first shape data which indicates a shape of a subject measured in association with the subject in a first state, and second shape data which indicates a shape of the subject measured in association with the subject in a second state; a generation unit configured to obtain basis data required to express a deformation from the first state to the second state, based on the data sets for the plurality of subjects; and an estimation unit configured to estimate, based on the generated basis data and data indicating a shape of a target subject measured in association with the target subject in the first state, a deformation from the first state to the second state in association with the target subject.

Further features of the present invention will become apparent from the following description of exemplary embodiments (with reference to the attached drawings).

DESCRIPTION OF THE EMBODIMENTS

First Embodiment

Overview of First Embodiment

When medical images captured to have different body positions (a first deformation condition and second deformation condition according to body positions at capturing timings) are obtained, a processing apparatus according to this embodiment estimates deformations of the images, and aligns the images. Note that a case will be described hereinafter wherein MRI images of a breast captured at a supine position and prone position are used as processing targets. However, body positions of a subject and the type of modality are not limited to them.

The processing apparatus according to this embodiment obtains information related to deformations of breasts associated with changes in body position from the prone position to the supine position of a large number of subjects based on image pairs captured at these two positions. In this case, the information related to the deformation of a breast includes information related to a shape of a breast at the prone position and information related to a deformation of the shape of the breast at the supine position. In this embodiment, these pieces of information will be referred to as case data hereinafter. By applying statistical analysis such as principal component analysis to a large number of obtained case data, a statistical model of a deformation related to a breast is generated. A phase for executing this processing will be referred to as a learning phase hereinafter. In this embodiment, processing for estimating a deformation of a breast of a case (unknown case) which is not included in the case data using the statistical model generated in the learning phase is executed. A phase for executing this processing will be referred to as a deformation estimation phase hereinafter. With the learning phase and deformation estimation phase, a correspondence relationship between a prone image and supine image of the unknown case can be clarified. Also, the correspondence relationship can be displayed to be visually recognized by the user. Note that this embodiment will exemplify a case using MRI images as an example of three-dimensional medical images. However, an embodiment of the present invention is not limited to this, and X-ray CT images, PET images, and the like may be used. Note that MRI images will be simply referred to as images hereinafter.

[Functional Arrangement]

Figure 1:
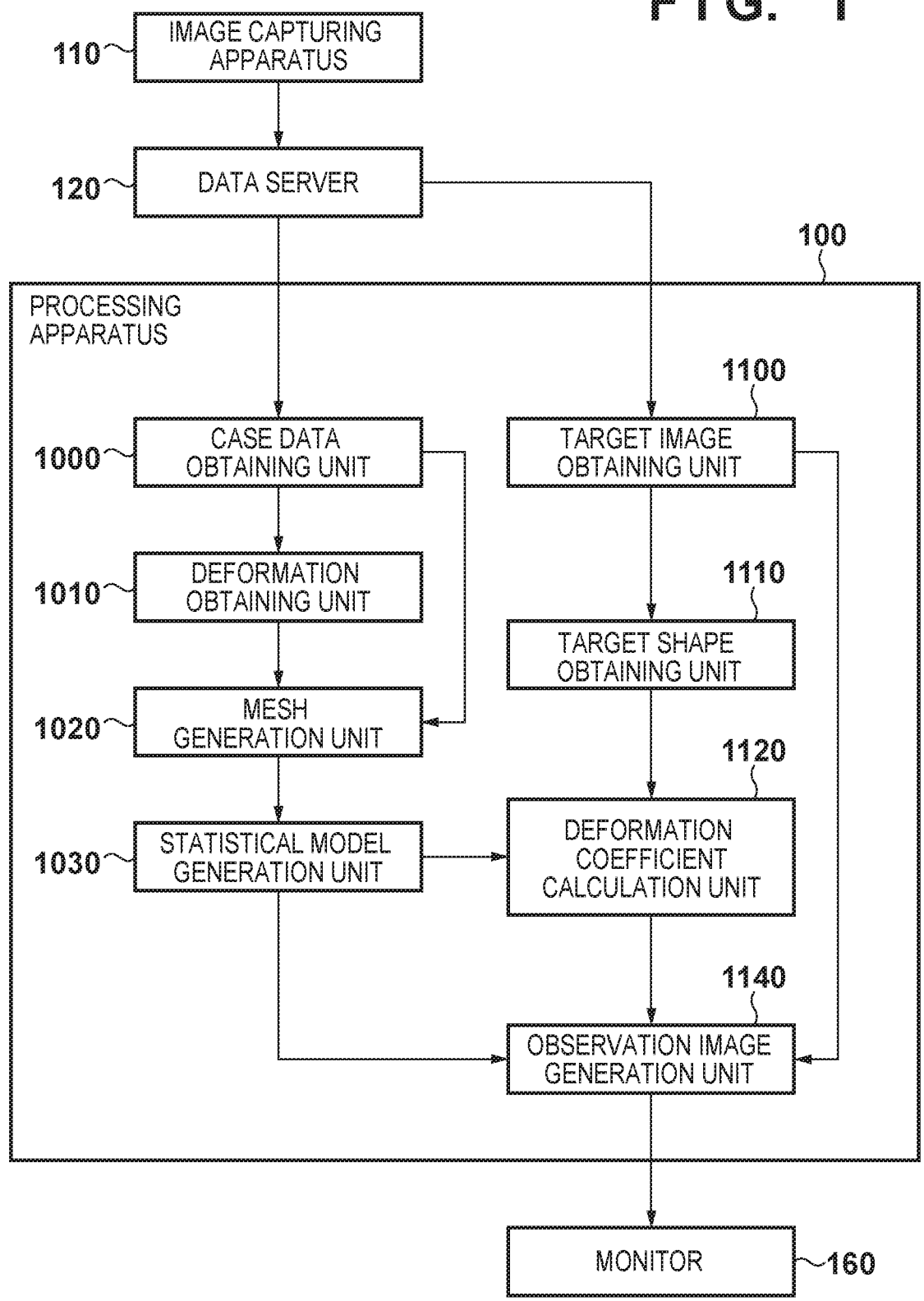
FIG. 1 is a block diagram showing the functional arrangement of a processing system according to the first embodiment.

FIG. 1 is a block diagram showing the functional arrangement of the processing system according to this embodiment. A processing apparatus 100 of this embodiment includes a learning phase processing function and deformation estimation phase processing function. The learning phase processing function includes elements of a case data obtaining unit 1000, deformation obtaining unit 1010, mesh generation unit 1020, and statistical model generation unit 1030. On the other hand, the deformation estimation phase processing function includes elements of a target image obtaining unit 1100, target shape obtaining unit 1110, deformation coefficient calculation unit 1120, and observation image generation unit 1140. The processing apparatus 100 is connected to a data server 120 and monitor 160.

An image capturing apparatus 110 obtains information related to three-dimensional areas in subjects as human bodies in association with a plurality of cases by a nuclear magnetic resonance method. That is, the image capturing apparatus 110 obtains images. The image capturing apparatus 110 transmits obtained images to the data server 120. The data server 120 holds images captured by the image capturing apparatus 110. Next, elements included in the processing apparatus 100 will be described below. The case data obtaining unit 1000 obtains image groups (case data) captured by the image capturing apparatus 110 via the data server 120, and inputs them to the processing apparatus 100. The deformation obtaining unit 1010 obtains deformation information between prone and supine positions of breasts of respective subjects from the case data obtained by the case data obtaining unit 1000. The mesh generation unit 1020 generates meshes of breasts at prone and supine positions of each subject based on the case data obtained by the case data obtaining unit 1000 and deformation obtaining unit 1010.

The statistical model generation unit 1030 derives statistical models associated with shapes and deformations of breasts in association with a large number of subjects based on the meshes of the breasts generated by the mesh generation unit 1020. The target image obtaining unit 1100 obtains images related to a subject (target case) as a deformation estimation target of the processing apparatus 100 from the data server 120, and inputs them into the processing apparatus 100. The target shape obtaining unit 1110 obtains information related to body surface shapes and nipple positions in association with prone and supine positions of the target case based on the images of the target case obtained by the target image obtaining unit 1100. The deformation coefficient calculation unit 1120 calculates deformation coefficients required to approximate the deformation from the prone position to the supine position of the target case using the aforementioned statistical models based on the statistical model derived by the statistical model generation unit 1030 and the information related to the body surface shapes and nipple positions obtained by the target shape obtaining unit 1110.

The observation image generation unit 1140 generates an observation image based on the breast images at the prone and supine positions obtained by the target image obtaining unit 1100, the statistical models generated by the statistical model generation unit 1030, and the deformation coefficients calculated by the deformation coefficient calculation unit 1120. Then, the observation image generation unit 1140 outputs that observation image to the monitor 160 to be presented to the user. The monitor 160 displays the observation image generated by the observation image generation unit 1140.

[Apparatus Arrangement]

Figure 2:
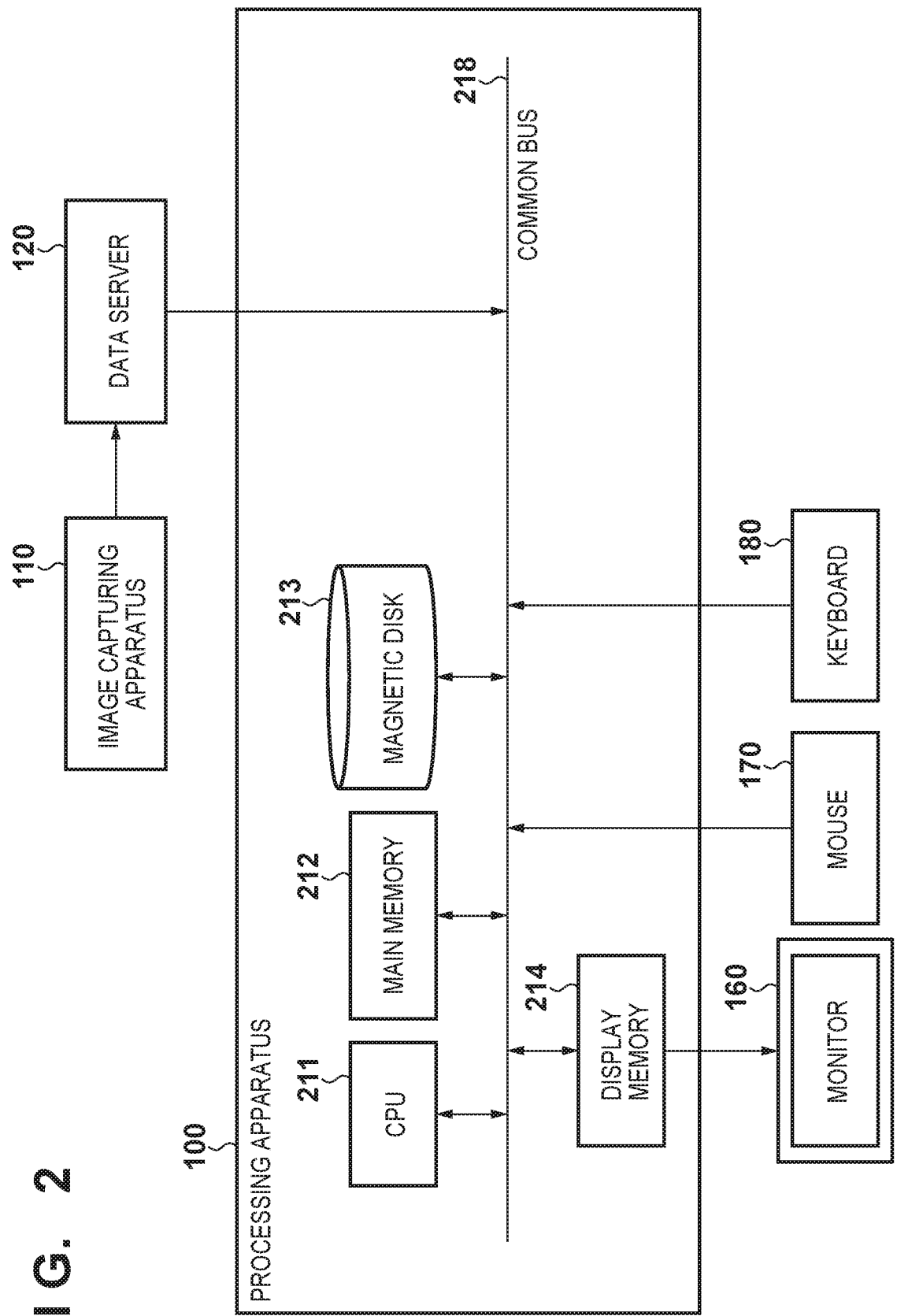
FIG. 2 is a block diagram showing the apparatus arrangement of the processing system according to the first embodiment.

FIG. 2 is a block diagram showing the apparatus arrangement of the processing system according to this embodiment. The processing system of this embodiment includes the processing apparatus 100, the image capturing apparatus 110, the data server 120, the monitor 160, a mouse 170, and a keyboard 180. The processing apparatus 100 can be implemented by, for example, a personal computer (PC) or the like.

The processing apparatus 100 includes a CPU (Central Processing Unit) 211, main memory 212, magnetic disk 213, and display memory 214. The CPU 211 mainly controls operations of respective components of the processing apparatus 100. The main memory 212 stores a control program to be executed by the CPU 211. Also, the main memory 212 is used as a work area when the CPU 211 executes the program. The magnetic disk 213 stores an OS (Operating System), device drivers of peripheral devices, various application software programs including those required to execute respective processes and the like, and so forth. The display memory 214 temporarily stores display data for the monitor 160. The monitor 160 is, for example, a CRT monitor, liquid crystal monitor, or the like, and displays an image based on data from the display memory 214. The mouse 170 and keyboard 180 are used to allow the user to make a pointing input and to input characters, commands, and the like. Then, these components are connected via a common bus 218 to be able to communicate with each other.

[Processing Sequence]

Figure 3:
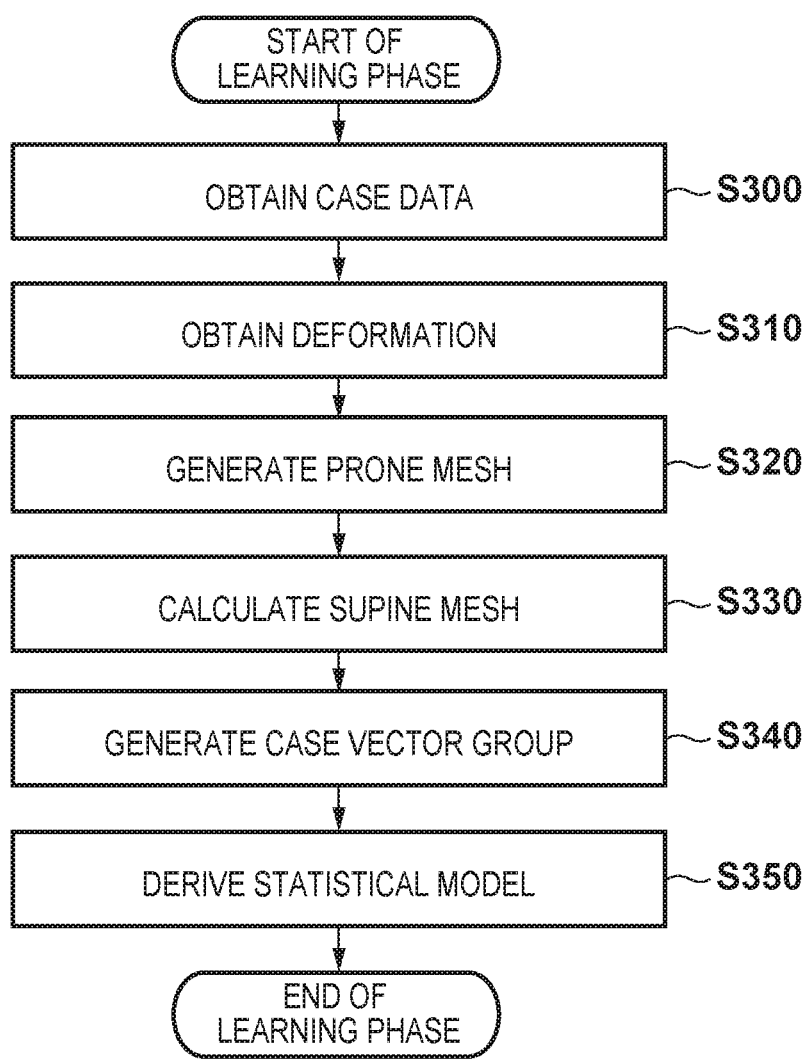
FIG. 3 is a flowchart showing the learning phase processing sequence according to the first embodiment.
Figure 4:
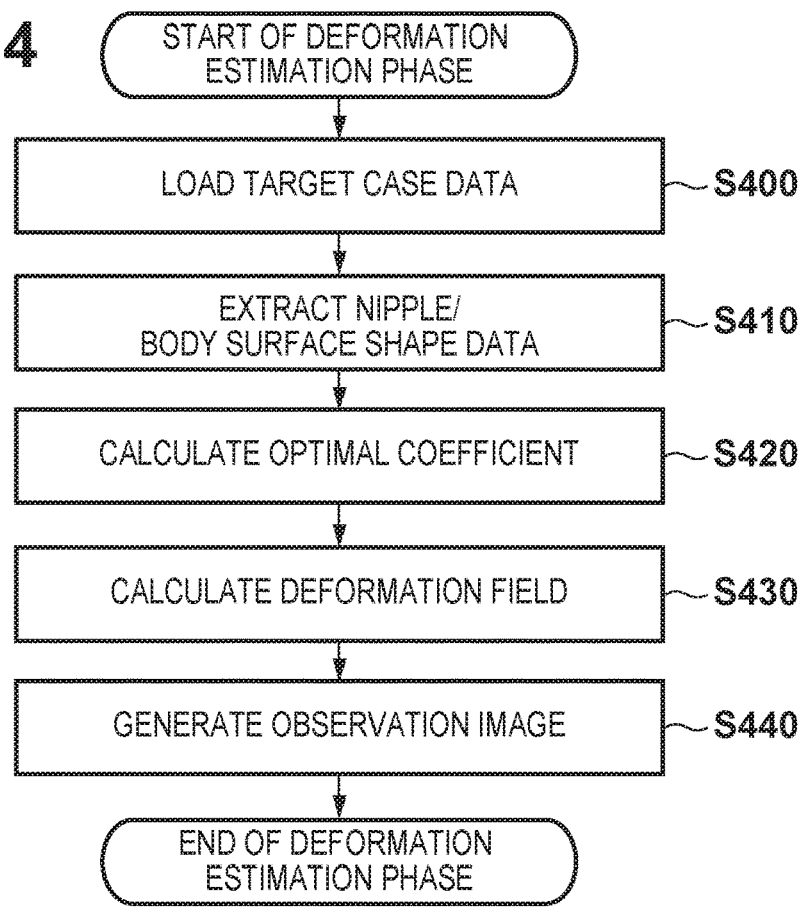
FIG. 4 is a flowchart showing the deformation estimation phase processing sequence according to the first embodiment.

The processing to be executed by the processing apparatus 100 according to this embodiment will be described in detail below with reference to the flowcharts shown in FIGS. 3 and 4. FIG. 3 is a flowchart of learning phase processing to be executed by the processing apparatus 100 in this embodiment. FIG. 4 is a flowchart of deformation estimation phase processing to be executed by the processing apparatus 100 in this embodiment. In the learning phase, processing for generating statistical models related to shapes and deformations of breasts based on breast image groups (first and second shape data) at prone and supine positions (first and second deformation conditions) is executed. On the other hand, in the deformation estimation phase, processing for estimating deformations of unknown cases based on the generated statistical models is executed. Note that the statistical models will be described in detail in the description of the processing of this embodiment.

In this embodiment, the aforementioned processes are implemented when the CPU 211 executes programs stored in the main memory 212. Results of respective processes (to be described later) executed by the processing apparatus 100 are stored and recorded in the main memory 212. The learning phase processing of this embodiment will be described first with reference to FIG. 3.

(1) Obtain Case Data (Step S300)

Assume that image groups (case data) of breasts captured by the image capturing apparatus 110 are stored in the data server 120 prior to this processing step. In this processing step, the case data obtaining unit 1000 inputs the stored breast image groups (case data) into the processing apparatus 100. The case data include images captured at two different body positions, that is, prone and supine positions per breast. Each of the images of the case data is expressed by a three-dimensional coordinate system (image coordinate system). In this embodiment, a lateral direction of a human body is defined as an X axis, and a leftward direction of the human body is defined as a positive direction of the X axis. Also, a back-and-forth direction of the human body is defined as a Y axis, and a back direction of the human body is defined as a positive direction of the Y axis. Then, a body axis direction is defined as a Z axis, and a head direction of the human body is defined as a positive direction of the Z axis.

Coordinates between prone images and supine images are aligned for respective breasts. The coordinates are adjusted in the vicinity of a breast and with reference to shapes of a body of sternum, costal bones, backbone, greater pectoral muscle surface, and the like, which suffer small position variations due to deformations. These shapes are properly used as references since they nearly match between the prone image and supine image of an identical breast. Note that such alignment may be executed in this processing step. In either case, alignment can be executed by a known method (manual or automatic). This embodiment will explain an example in which such case data obtaining processing is executed for N breasts. Also, assume that case data in this embodiment are related to right breasts of human bodies.

(2) Obtain Deformation (Step S310)

Figure 5:
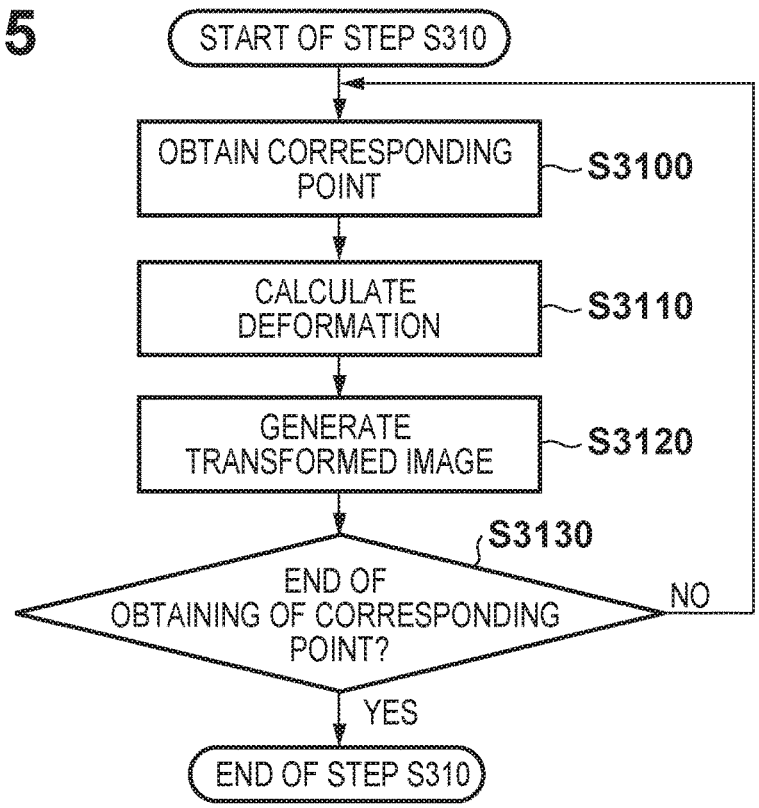
FIG. 5 is a flowchart showing the processing sequence of step S310 according to the first embodiment.

In this processing step, the deformation obtaining unit 1010 obtains deformation information between prone and supine positions of respective breasts based on the N case data (step S300). This information means a relationship between an arbitrary coordinate value in a prone image and a corresponding coordinate value in a supine image. For example, this information means a relationship between coordinates of areas such as a lesion area and blood vessel branches in a prone image and those of these areas in a supine image. That is, such relationship can be expressed as a function $f_i$ of obtaining, based on an arbitrary coordinate value $x_{prone,i}$ in a prone image, a corresponding coordinate value $x_{supine,i}$ in a supine image, as described by:

$$x_{supine,i} f_i(x_{prone,i}) \tag{1}$$

where suffix i is an index of a breast in the case data, and $1 \leq i \leq N$ in this embodiment. The processing of step S310 will be described in detail below with reference to the flowchart shown in FIG. 5 and FIGS. 6A and 6B.

(2-1) Obtain Corresponding Point (Step S3100)

Figure 6A:
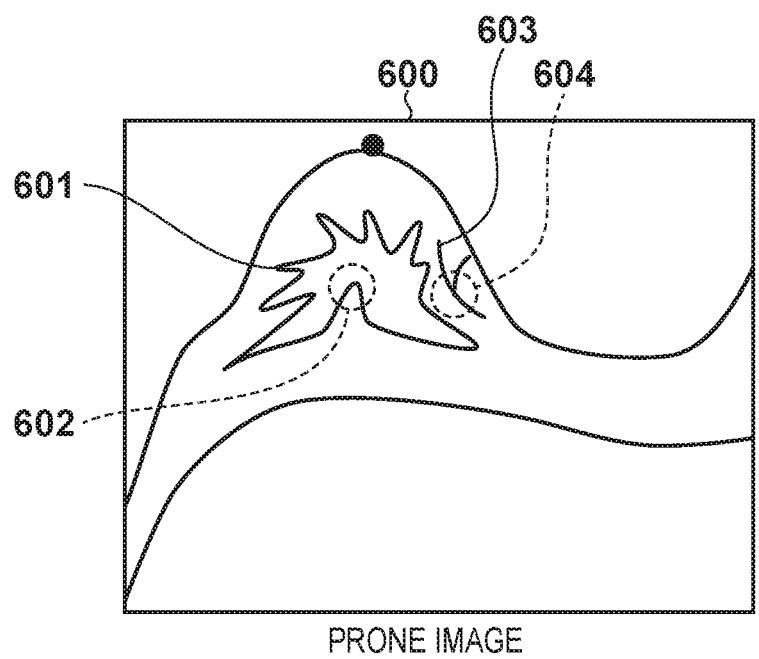
FIGS. 6A and 6B are explanatory views of the processing of step S310 according to the first embodiment.
Figure 6B:
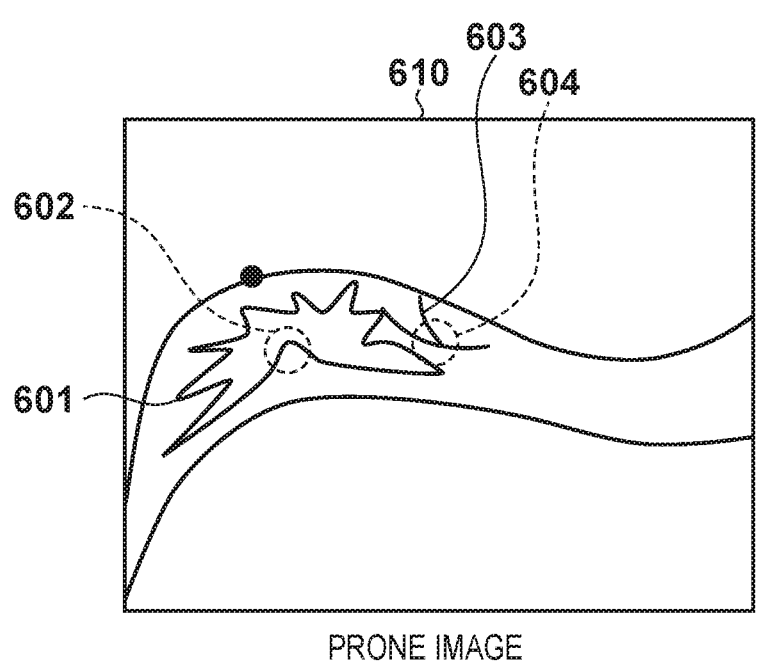

In this processing step, the deformation obtaining unit 1010 presents a prone image 600 and supine image 610 to the user by displaying these images on the monitor 160 or the like (FIGS. 6A and 6B). In this case, a mammary gland contour 601 and blood vessel 603 are drawn in the respective images. The user can visually recognize a characteristic area 602, blood vessel branch 604, and the like in a mammary gland structure as corresponding regions (corresponding points) in the prone and supine images. Then, the user obtains a plurality of position coordinates of them by operating the mouse 170 and keyboard 180 (to be referred to as "input operation" hereinafter).

(2-2) Deformation Calculation (Step S3110)

In this processing step, the deformation obtaining unit 1010 calculates the function $f_i$ given by equation (1) based on position coordinates of a plurality of corresponding points in the prone and supine images (step S3100). This processing calculates a continuous deformation based on a plurality of discrete corresponding points on a space. This processing is executed using a known interpolation method.

For example, a method using a radial basis function, and a method using a B-spline called an FFD (Free Form Deformation) method may be used. As a result of this processing, the function $f_i$ given by equation (1) is obtained. Then, the deformation obtaining unit 1010 stores information of the calculated function $f_i$ in the main memory 212.

(2-3) Generate Transformed Image (Step S3120)

In this processing step, the deformation obtaining unit 1010 generates a virtual supine image by transforming the prone image using the function $f_i$. This processing can be executed by applying the function $f_i$ to image coordinates of respective pixels which form the prone image.

(2-4) Corresponding Point Obtaining End Determination (Step S3130)

In this processing step, the deformation obtaining unit 1010 determines whether or not the processing of step S310 is to end. If the deformation obtaining unit 1010 determines that the processing is to end, it ends the processing of step S310. On the other hand, if the deformation obtaining unit 1010 determines that the processing is not to end, the process returns to step S3100 to additionally obtain corresponding points. More specifically, the deformation obtaining unit 1010 displays the virtual supine image (step S3120) and the supine image of the subject (step S300) on the monitor 160. Then, the deformation obtaining unit 1010 determines based on a user's input operation whether or not the processing is to end. The user judges whether or not sufficient corresponding points are acquired so that the virtual supine image is approximate to the supine image of the subject, and can switch whether or not to end the processing. The processing of step S310 of this embodiment has been described. Note that the processing of step S310 is executed for all the N case data.

(3) Generate Prone Mesh (Step S320)

Figure 7:
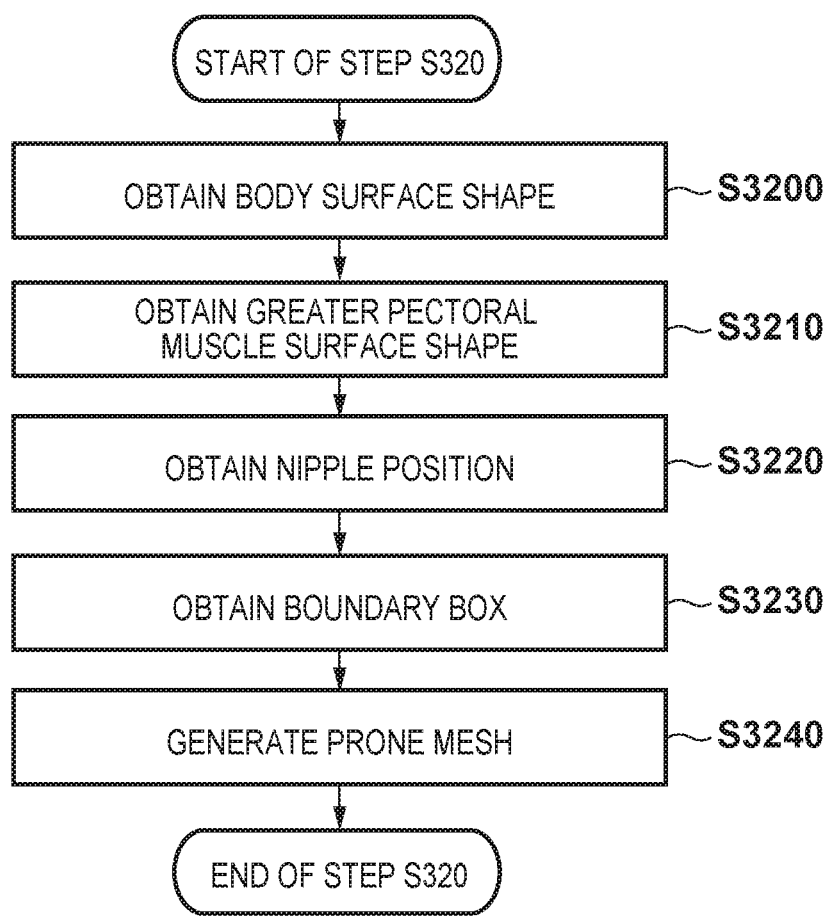
FIG. 7 is a flowchart showing the processing sequence of step S320 of a processing apparatus according to the first embodiment.

In this processing step, the mesh generation unit 1020 generates a mesh structure in the prone image of each case data (step S300). FIG. 7 is a flowchart for explaining the processing of step S320 in detail. The following description will be given using FIG. 7.

(3-1) Obtain Body Surface Shape (Step S3200)

In this processing step, the mesh generation unit 1020 obtains a shape of a body surface of a subject drawn in the prone image. This processing can be executed by obtaining the body surface shape by a user's input operation. This processing will be described in detail below with reference to FIGS. 8A and 8B.

Figure 8A:
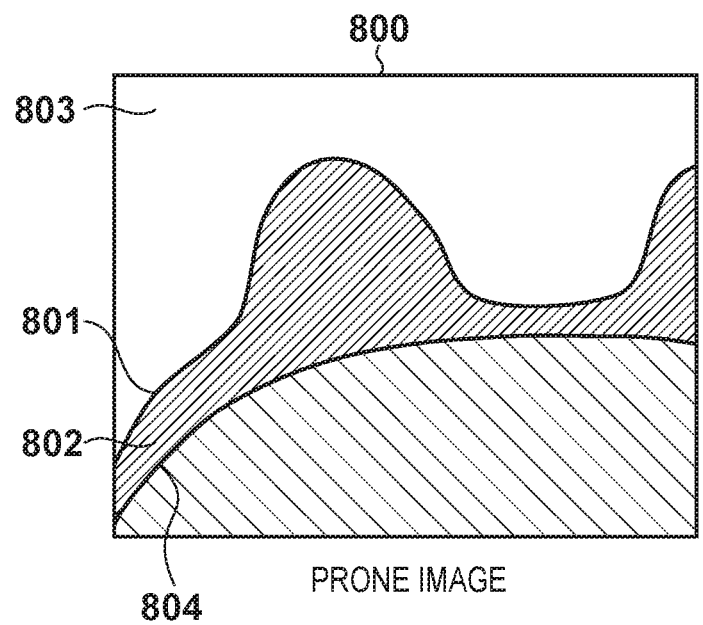
FIGS. 8A and 8B are explanatory views of the processes of steps S3200 and S3210 of the processing apparatus according to the first embodiment.
Figure 8B:
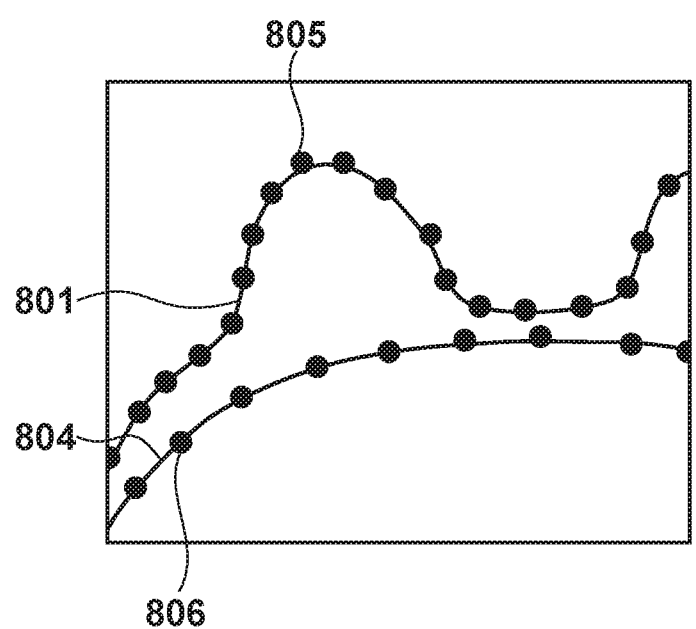

In this processing step, the mesh generation unit 1020 presents a prone image of the subject to the user by displaying that image on the monitor 160. FIG. 8A shows a prone image 800 of the subject displayed on the monitor 160. In the prone image 800, a body surface 801 is a border between a breast region 802 and air region 803. The user visually observes the prone image 800 displayed on the monitor 160, thus visually recognizing the body surface 801. Then, the mesh generation unit 1020 obtains a body surface point group 805 by a user's input operation. The body surface point group 805 is a group of points on the body surface, as shown in FIG. 8B. Next, the mesh generation unit 1020 converts positions of this body surface point group into continuous curved surface information by an interpolation method using a spline method or the like. Then, the mesh generation unit 1020 records that information in the main memory 212.

(3-2) Obtain Greater Pectoral Muscle Surface Shape (Step S3210)

In this processing step, the mesh generation unit 1020 obtains a shape of a greater pectoral muscle surface of the subject drawn on the prone image. This processing can be executed by the same method as in step S3200. That is, the mesh generation unit 1020 obtains a point group 806 of a greater pectoral muscle surface 804 by a user's input operation, and converts the obtained point group into continuous curved surface information by interpolation processing. The mesh generation unit 1020 records that information in the main memory 212.

(3-3) Obtain Nipple Position (Step S3220)

In this processing step, the mesh generation unit 1020 obtains a position of a nipple of the subject drawn on the prone image. This processing can be executed by the same method as in steps S3200 and S3210. That is, the mesh generation unit 1020 displays an image on the monitor 160, and obtain a nipple position by a user's input operation. Then, the mesh generation unit 1020 records that information in the main memory 212.

(3-4) Obtain Boundary Box (Step S3230)

In this processing step, the mesh generation unit 1020 obtains a boundary box in the prone image based on the pieces of information obtained in steps S3200 to S3220. More specifically, the mesh generation unit 1020 obtains positions of an upper end, lower end, inner end, exterior end, anterior end, and posterior end of a breast of each case data, and obtains a rectangular parallelepiped region bounded by these positions. Initially, the mesh generation unit 1020 executes processing for obtaining the positions of the upper end and lower end of the breast. This processing will be described below with reference to FIGS. 9A and 9B.

Figure 9A:
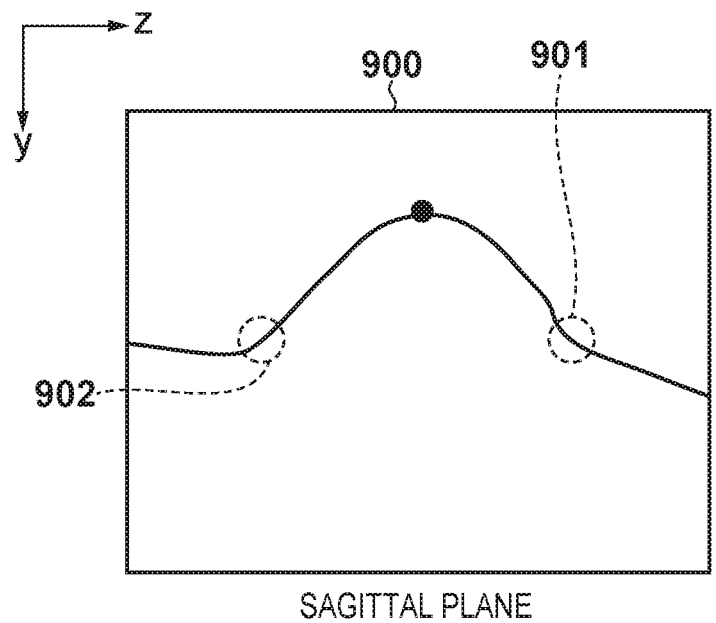
FIGS. 9A and 9B are explanatory views of the processing of step S3230 of the processing apparatus according to the first embodiment.

FIG. 9A shows a sagittal plane (Y-Z plane) 900 including the nipple position (step S3220) of the prone image. The mesh generation unit 1020 displays this image on the monitor 160, and obtains an upper end position 901 and lower end position 902 by a user's input operation. The mesh generation unit 1020 records a coordinate value of the obtained upper end position 901 as $z_{UPPER,i}$ in the main memory 212. Likewise, the mesh generation unit 1020 records the lower end position 902 as $z_{LOWER,i}$ in the main memory 212. In this case, suffix i is an index of case data, and $z_{LOWER,i} < z_{UPPER,i}$.

Figure 9B:
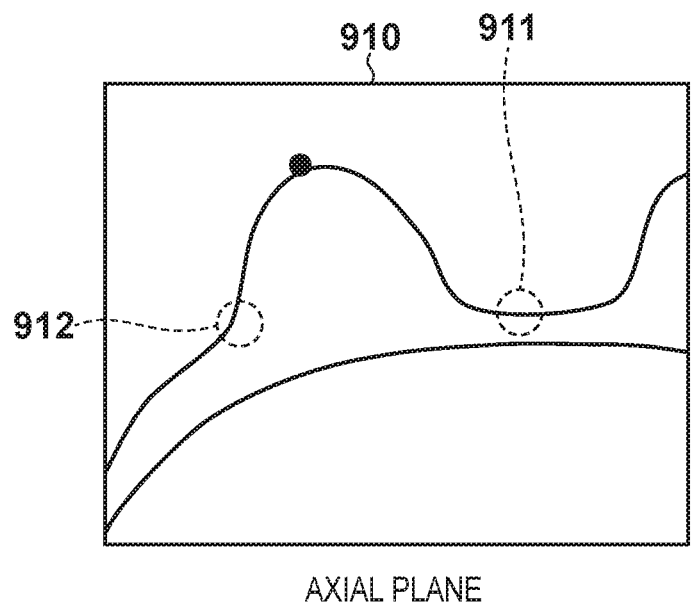

Next, the mesh generation unit 1020 executes processing for obtaining the positions of the inner and exterior ends of the breast. FIG. 9B shows an axial plane (X-Y plane) 910 including the nipple position (step S3220) of the prone image. The mesh generation unit 1020 displays this image on the monitor 160, and obtains an inner end position 911 and exterior end position 912 by a user's input operation. The mesh generation unit 1020 records the obtained inner end position as $x_{INNER,i}$ in the main memory 212. Likewise, the mesh generation unit 1020 records the exterior end position as $x_{EXTERIOR,i}$ in the main memory 212. In this embodiment using a right breast of a human body as case data, $x_{EXTERIOR,i} < x_{INNER,i}$.

Based on the upper end, lower end, inner end, and exterior end positions of the case data obtained by the aforementioned processing, the mesh generation unit 1020 obtains a two-dimensional boundary box region on the X-Z plane. This region is a region on the x-z plane which meets $z_{LOWER,i} \leq z \leq z_{UPPER,i}$ and $x_{EXTERIOR,i} \leq x \leq x_{INNER,i}$.

Next, the mesh generation unit 1020 executes processing for obtaining the anterior and posterior end positions of the case data. The anterior end position assumes a minimum value on the Y axis in the boundary box region of the body surface point group (S3200), and is obtained by a known method. The mesh generation unit 1020 records the obtained anterior end position as $y_{ANTERIOR,i}$ in the main memory 212. On the other hand, the posterior end position assumes a maximum value on the Y axis in the boundary box region of the greater pectoral muscle surface point group (step S3210), and is obtained by a known method. The mesh generation unit 1020 records the obtained posterior end position as $y_{POSTERIOR,i}$ in the main memory 212. A three-dimensional rectangular region bounded by the upper end, lower end, inner end, exterior end, anterior end, and posterior end of the case data, which are obtained by the aforementioned processing, defines a boundary box to be obtained in this step.

(3-5) Generate Prone Mesh (Step S3240)

In this processing step, the mesh generation unit 1020 generates a mesh inside the boundary box (step S3230).

Figure 10A:
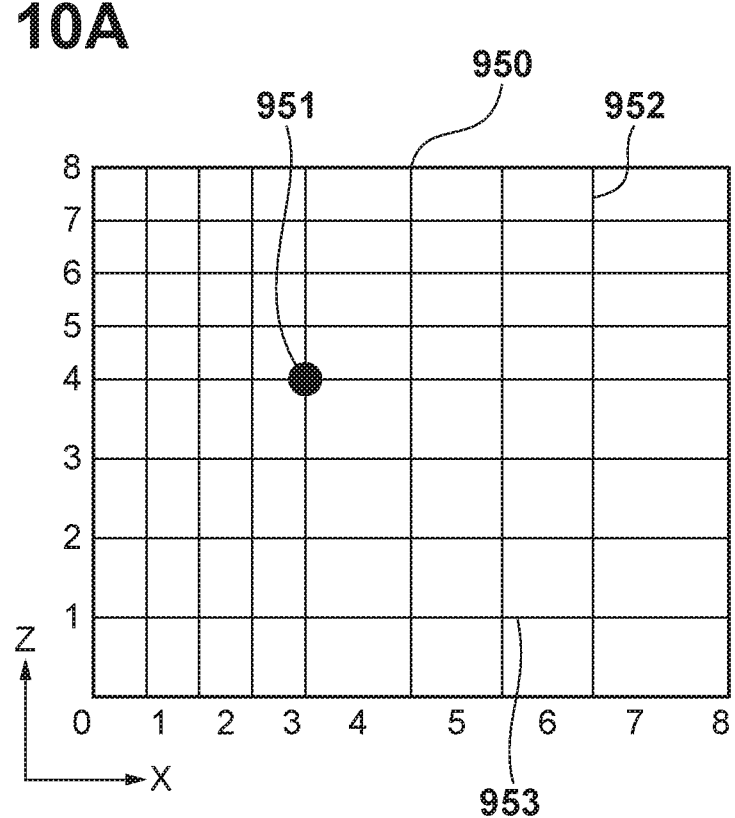
FIGS. 10A and 10B are explanatory views of the processing of step S3240 of the processing apparatus according to the first embodiment.
Figure 10B:
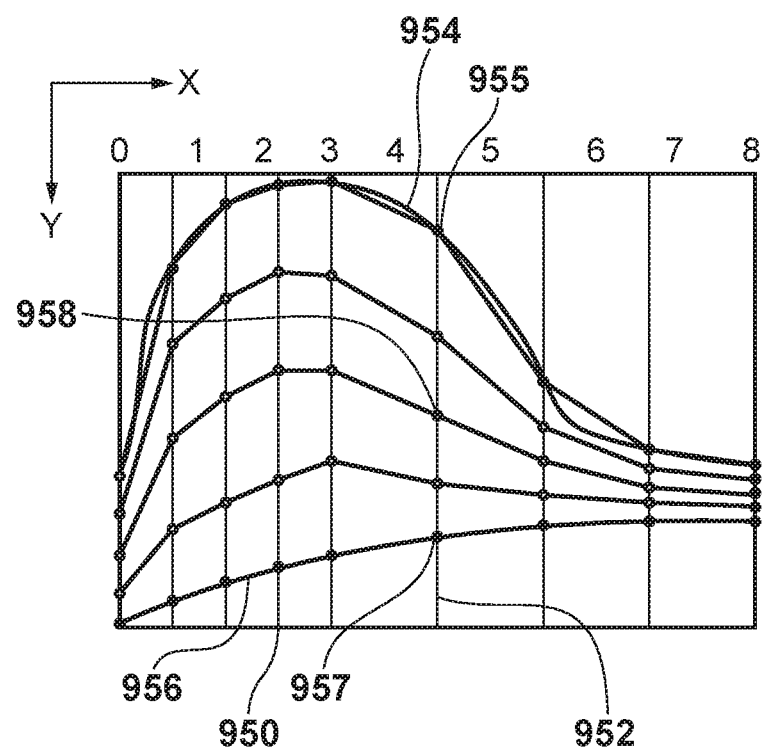

FIGS. 10A and 10B are views for explaining an example of the practical processing of step S3240. In this processing, a boundary box 950 is divided by a predetermined value in directions of the X and Z axes to have a nipple position 951 as the center. In the example shown in FIG. 10A, the boundary box is divided into four in an X-axis positive direction and X-axis negative direction to have the nipple position as the center. Likewise, the boundary box is divided into four in a Z-axis positive direction and Z-axis negative direction. In this manner, an X-Z plane of the boundary box 950 is divided into 64 by X-axis division planes 952 and Z-axis division planes 953.

FIG. 10B shows an arbitrary one plane (X-Y plane) of the plurality of Z-axis division planes 953 shown in FIG. 10A. As shown in FIG. 10B, body surface nodes 955 are set at intersecting positions of the X-axis division planes 952 and a body surface shape 954 on the X-Y plane. Likewise, greater pectoral muscle surface nodes 957 are set at intersecting positions of the X-axis division planes 952 and a greater pectoral muscle surface shape 956. Then, a plane between the body surface node 955 and greater pectoral muscle surface node 957 on the identical X-axis division plane 952 is divided by a predetermined number of internal nodes 958. FIG. 10B shows the example in which the plane between the body surface node 955 and greater pectoral muscle surface node 957 is divided into four. The same processing applies to all the Z-axis division planes. Then, the mesh generation unit 1020 records the positions of the generated body surface nodes, greater pectoral muscle surface nodes, and internal nodes in the main memory 212.

In this embodiment, when the boundary box is divided, as shown in FIGS. 10A and 10B, 81 body surface nodes, 81 greater pectoral muscle surface nodes, and 243 internal nodes are generated. Letting M be the total number of nodes, M=405 in this embodiment. These node positions are recorded by appending numbers (node numbers) in a raster-scan order. In this embodiment, a node position is described by $x_{pnode,i,j}$. In this case, suffix i is an index ($1 \leq i \leq N$) of case data, and j is a node number ($1 \leq j \leq M$). Also, adjacency relations between these nodes are recorded. Information of the positions of nodes and adjacency relations between nodes will be referred to as mesh information hereinafter. Furthermore, a hexahedron formed by connecting eight node points in adjacency relations will be referred to as a mesh element hereinafter. Then, in this embodiment, 256 mesh elements are formed.

In this processing step, a node number indicating the nipple position is further recorded as $n_{nipple}$. Also, numbers of a plurality of body surface nodes located at the inner end of the breast are recorded as $n_{inner,k}$. In this case, suffix k is an index of each of a plurality of node numbers, and $1 \leq k \leq K$ where K is the number of body surface nodes located at the inner end of the breast, and K=9 in this embodiment.

The processing of step S320 of this embodiment has been described. Note that in this embodiment, the processing of this processing step is executed for all the N case data. As a result, as information of meshes formed for respective case data, the numbers of nodes and the numbers of mesh elements are equal. Also, positions of nodes at identical node number anatomically represent roughly the same positions between case data.

(4) Calculate Supine Mesh (Step S330)

In this processing step, the mesh generation unit 1020 calculates node positions $x_{snode,i,j}$ of supine meshes. This calculation processing is executed based on the deformation information (function $f_i$) and the node position information $x_{pnode,i,j}$ of prone meshes. More specifically, a calculation given by:

$$x_{snode,i,j} = f_i(x_{pnode,i,j}) \qquad (2)$$

is executed for all the nodes of all the N case data.

(5) Generate Case Vector Group (Step S340)

In this processing step, the statistical model generation unit 1030 generate a case vector based on the pieces of information prone and supine meshes. In this embodiment, a vector set (first and second vectors) obtained by arranging position coordinate values of nodes of prone and supine meshes of a breast of each case will be referred to as a case vector hereinafter. In this embodiment, the numbers of nodes of prone and supine meshes are respectively M, and position coordinates of respective nodes are three-dimensional vectors. Therefore, the case vector is expressed by a vector of 6×M dimensions, as described by:

$$x_{sample,i} = \begin{pmatrix} x_{pnode,i} \\ x_{snode,i} \end{pmatrix} = \begin{pmatrix} x_{pnode,i,1} \\ x_{pnode,i,2} \\ \vdots \\ x_{pnode,i,M} \\ x_{snode,i,1} \\ x_{snode,i,2} \\ \vdots \\ x_{snode,i,M} \end{pmatrix} = \begin{pmatrix} x_{pnode,i,1} \\ y_{pnode,i,1} \\ z_{pnode,i,1} \\ \vdots \\ x_{snode,i,M} \\ y_{snode,i,M} \\ z_{snode,i,M} \end{pmatrix} \qquad (3)$$

The statistical model generation unit 1030 executes the aforementioned processing for all the N case data, thus generating N case vector groups.

(6) Derive Statistical Model (Step S350)

In this processing step, the statistical model generation unit 1030 statistically analyzes case vector groups $x_{sample,i}$ to derive a statistical model. As a statistical analysis method of the case vector group, for example, principal component analysis is used. In this case, a mean vector $x_{average}$ and principal component vector $e_d$ ($1 \leq d \leq D$) of the case vector groups $x_{sample,i}$ are calculated. These D+1 vectors will be referred to as a statistical model hereinafter. In this case, D is the number of principal components to be calculated by the principal component analysis, and is decided by a method of providing a threshold to a cumulative contribution ratio, a method of using a fixed value, or the like.

The statistical model will be additionally explained below. The statistical model derived in this embodiment has meanings of statistical descriptions of the shape and deformation of the breast. For example, case data $x_{sample,i}$ ($1 \leq i \leq N$) can be approximated by the mean vector $x_{average}$ and a weighted sum of principal component vectors $e_d$, as given by:

$$x_{sample,i} \cong x_{average} + \sum_{d=1}^{D} c_{d,i} e_d \quad (4)$$

where $c_{d,i}$ (1≤d≤D, 1≤i≤N) is a coefficient related to the weighted sum of the principal component vectors. Expression (4) can be rewritten as:

$$x_{sample,i} \cong x_{average} + E c_i \quad (5)$$

where E is a matrix obtained by arranging the principal component vectors, that is, $E=\{e_1, e_2, \ldots, e_D\}$, which will be referred to as a principal component matrix hereinafter. Also, ci is a vector obtained by arranging the coefficients $c_{d,i}$ included in expression (4) in association with suffix d, that is, $c_i = \{c_1, c_2, \ldots, c_D\}^T$, which vector will be referred to as a coefficient vector hereinafter. The statistical model to be derived in this embodiment can express various shapes and deformations of breasts including case data by variously changing this coefficient vector.

In this processing step, next, the statistical model generation unit 1030 calculates the coefficient vectors $c_i$ required to be approximated by the statistical model. The principal component vectors $e_d$ (1≤d≤D) mutually have orthonormal relations. Therefore, the coefficient vector required to approximate the case vector $x_{sample,i}$ can be calculated by:

$$c_i = E^T (x_{sample,i} - x_{average}) \quad (6)$$

The coefficient vectors are calculated for all the case data $x_{sample,i}$ (1≤i≤N). Then, the statistical model generation unit 1030 records the coefficient vectors $c_i$ (1≤i≤N) obtained as results in the main memory 212.

As described above, with the processes of steps S300 to S350, the learning phase processing of this embodiment is executed. Note that in the example of the above description, the processes of steps S300 to S330 are targeted at all the case data. However, the present invention is not limited to such specific embodiment. For example, the processes of steps S300 to S330 may be targeted at one case data. In this case, the series of processes are repeated as many as the number of case data. A maximum repetition count corresponds to the number (N) of case data. In this case, the processing may be aborted in a middle stage, and the processing of step S340 may be executed.

For example, when case data enough to execute the processes of step S400 and subsequent steps (to be described later) are obtained, the processing is aborted. At this time, whether or not to abort the processing can be judged by a user's input operation or based on the characteristics of the derived statistical model and the like. In the latter case, the above judgment is given by verifying approximation performance of the derived statistical model with respect to case data. For example, the approximation performance may be verified using a Leave-one-out method or the like, and whether or not to abort the processing may be automatically judged based on the result. The deformation estimation phase processing of this embodiment will be described below with reference to FIG. 4.

(1) Load Target Case Data (Step S400)

In this processing step, the target image obtaining unit 1100 obtains breast images of a case as a target of the deformation estimation processing from the data server 120. Such case will be referred to as a target case hereinafter. The target case is that for deformation estimation unlike a case from which images are obtained in step S300.

In this processing step, the target image obtaining unit 1100 obtains breast images (first and second target shape data) at prone and supine positions of the target case. These images are aligned with reference to a small variation area such as costal bones or the like as in step S300. Such alignment may be executed in this processing step, and that result may be obtained. Note that this embodiment will exemplify a case in which a right breast of the target case is used as a target.

(2) Extract Nipple/Body Surface Shape Data (Step S410)

In this processing step, the target shape obtaining unit 1110 obtains the nipple position and body surface shape based on the images (step S400) of the target case. This processing can be implemented by the same method as in steps S3200 and S3220. As a result, the three-dimensional coordinate value of the nipple position, and information such as a point group or implicit function which represents the body surface shape are obtained.

In this processing step, the nipple position and body surface shape may be automatically obtained by image processing instead of the above processing. In this case, the target shape obtaining unit 1110 executes edge detection from the images by a known method. Then, the target shape obtaining unit 1110 extracts a body surface shape on a three-dimensional space as a curved surface, and detects a nipple position using a curvature of that body surface shape.

In this processing step, the target shape obtaining unit 1110 further obtains a position of a midline at the prone position of the target case. Note that the midline is a curve on the body surface, which passes through the center of a right-and-left direction of the target case. The midline is a part of the obtained body surface shape of the target case, and is obtained in a form of a point group on the three-dimensional space, function, or the like. The position of the midline may be obtained based on a user's input operation or using symmetry of intensity values in an X-axis (right-and-left direction of a human body) direction of the obtained body surface shape or image. In this case, the target shape obtaining unit 1110 can obtain the body surface shape, which intersects with a symmetric plane in the X-axis direction of the image as the position of the midline.

(3) Derive Optimal Coefficient (Step S420)

Figure 11:
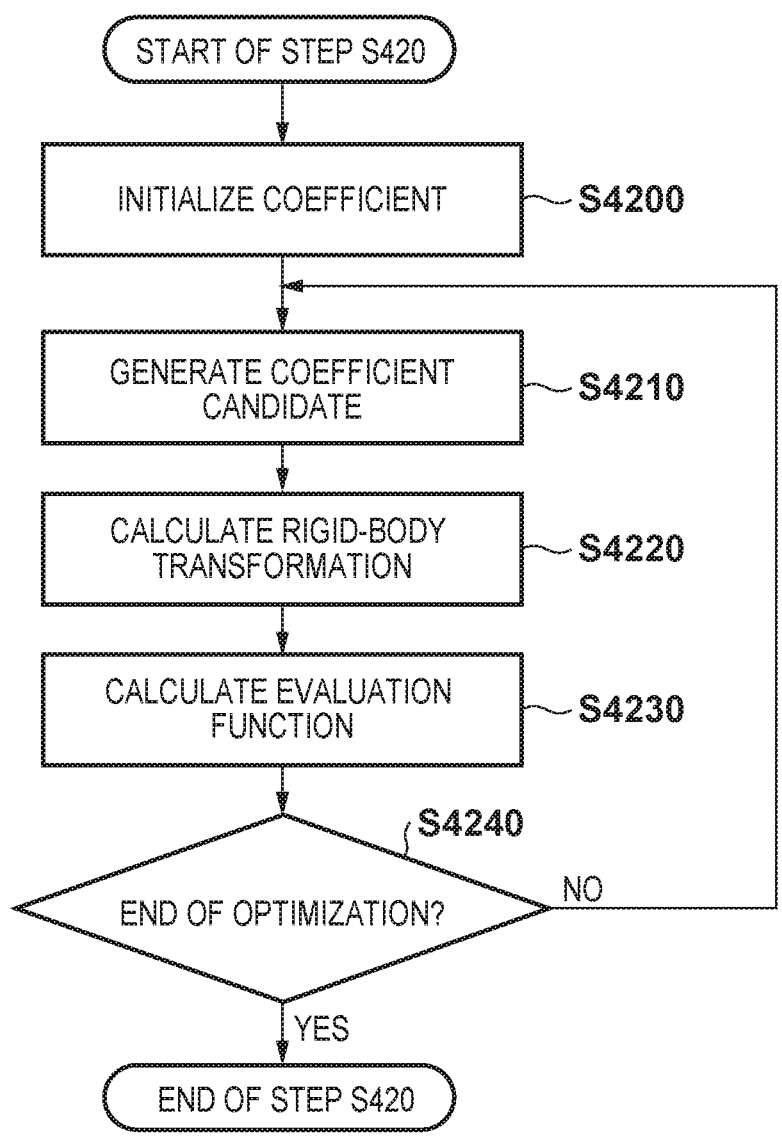
FIG. 11 is a flowchart showing the processing sequence of step S420 of the processing apparatus according to the first embodiment.

In this processing step, the deformation coefficient calculation unit 1120 calculates a coefficient of the statistical model and rigid-body transformation so that the shape expressed by the statistical model nearly matches that of the target case. In this embodiment, the coefficient of the statistical model and rigid-body transformation will be referred to as a deformation coefficient hereinafter. In this processing step, an appropriate deformation coefficient is calculated. This processing step will be described below with reference to the flowchart shown in FIG. 11.

(3-1) Initialize Coefficient (Step S4200)

In this processing step, the deformation coefficient calculation unit 1120 sets an initial value c' in association with the coefficients of the statistical model. The initial value c' can be, for example, a zero vector. In this embodiment, by repetitively executing processes of steps S4210 to S4240, the initial value c' is updated to a more optimal value. That is, the initial value c' set in this processing step is a provisional value of the coefficients of the statistical model.

(3-2) Generate Coefficient Candidate (Step S4210)

In this processing step, the deformation coefficient calculation unit 1120 generates coefficient variation candidates $c''_h$ based on the coefficient provisional value c' where h is an index of a coefficient variation candidate (1≤h≤H). In this case, H is the total number of coefficient variation candidates. As a practical generation method of $c''_h$, for example, $c''_h$ can be generated by varying elements of respective dimensions, as given by:

$$c''_1 = c'$$
$$c''_2 = c' + (\delta \ 0 \ \cdots \ 0)^T$$
$$c''_3 = c' + (-\delta \ 0 \ \cdots \ 0)^T$$
$$c''_4 = c' + (0 \ \delta \ 0 \ \cdots \ 0)^T \quad (7)$$
$$c''_5 = c' + (0 \ -\delta \ 0 \ \cdots \ 0)^T$$
$$\vdots$$
$$c''_{2D+1} = c' + (0 \ \cdots \ 0 \ -\delta)^T$$

where $\delta$ is a variation width, and a predetermined constant is set for this variation width.

In this case, the total number of coefficient variation candidates is 2D+1. D is the number of principal components to be calculated by the principal component analysis, as described above.

For each of the coefficient variation candidates $c''_h$, a shape $x''_h$ (1≤h≤H) is calculated using the statistical model given by expression (5) by:

$$x''_h = x_{average} + Ec''_h \quad (8)$$

In this embodiment, shapes x"h (1≤h≤H) will be referred to as provisional model shape groups hereinafter.

(3-3) Calculate Rigid-body Transformation (Step S4220)

In this processing step, the deformation coefficient calculation unit 1120 calculates a matrix which expresses a rigid-body transformation based on the provisional model shape groups (step S4210), and the body surface shape and midline of the target case (step S410). Initially, the deformation coefficient calculation unit 1120 calculates a rigid-body transformation (translation) which matches the nipple position at the prone position and $(n_{nipple})$-th node positions of the provisional model shape groups based on these positions. After that, the deformation coefficient calculation unit 1120 applies this rigid-body transformation to each of the provisional model shape groups. A matrix of 4 rows×4 columns, which matrix expresses this rigid-body transformation will be referred to as a rigid-body transformation matrix $m_{1,h}$ hereinafter. Then, the provisional model shape group $x''_h$ is transformed by the rigid-body transformation matrix $m_{1,h}$ to calculate a provisional model shape group $x''_{m1,h}$ where h is an index of the provisional mode shape group, and 1≤h≤H.

Figure 12A:
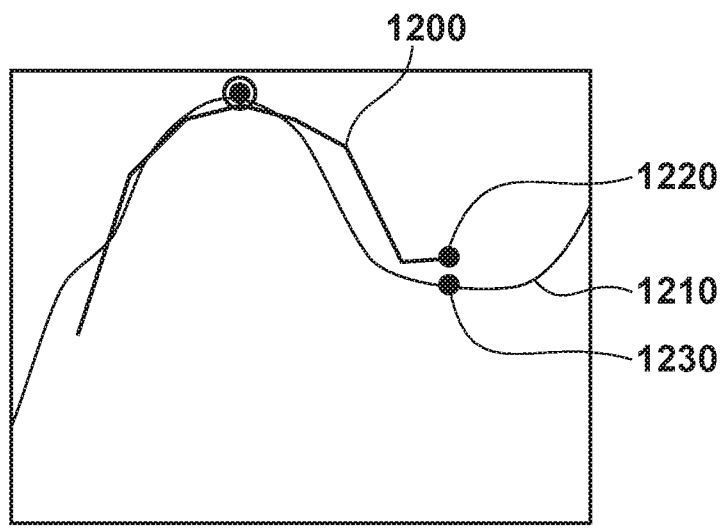
FIGS. 12A and 12B are explanatory views of the processing of step S4220 of a processing apparatus according to the second embodiment.

FIG. 12A is a view for explaining the relationship between the provisional model shape group $x''_{m1,h}$ to which the rigid-body transformation based on the rigid-body transformation matrix $m_{1,h}$ is applied, and the body surface shape and the midline position of the target case. In FIG. 12A, a body surface shape 1200 of the provisional model shape represents node positions of a body surface related to arbitrary one of the H provisional model shape groups $x''_{m1,h}$. As shown in FIG. 12A, neighboring nodes are connected via line segments for the sake of easy understanding of node positions. A body surface shape 1210 of the target case is that of the target case obtained in step S410. The body surface shape 1200 of the provisional model shape and the body surface shape 1210 of the target case are respectively three-dimensional curved surfaces, but they are illustrated as two-dimensional curves in FIG. 12A.

A midline 1220 of the provisional model shape is a position of the inner end of the body surface shape 1200 of the provisional model shape. Also, a midline 1230 is a position of the midline of the body surface shape 1210 of the target case. These midlines are curves on the three-dimensional space, but they are illustrated as points in FIG. 12A.

Figure 12B:
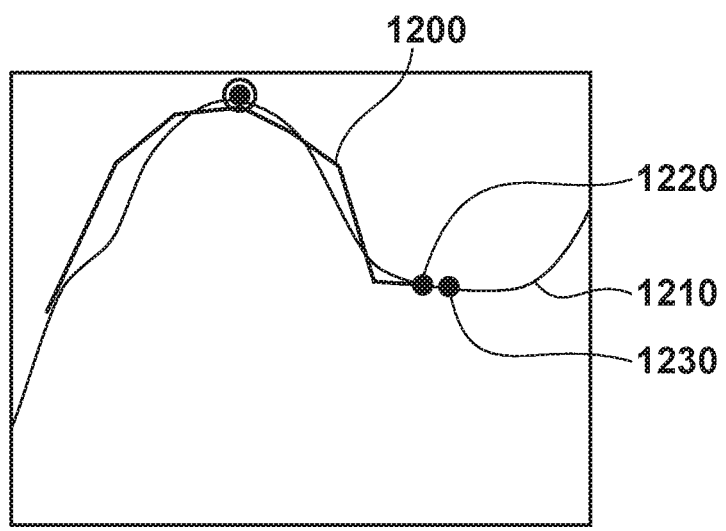

Next, the deformation coefficient calculation unit 1120 calculates a rigid-body transformation which roughly matches the midline 1220 of the provisional model shape and the midline 1230 of the target case, as shown in FIG. 12B. A matrix which expresses this rigid-body transformation will be referred to as a rigid-body transformation matrix $m_{2,h}$ hereinafter. Then, each provisional model shape $x''_{m1,h}$ is transformed using the rigid-body transformation matrix $m_{2,h}$ to calculate a provisional model shape $x''_h$. The rigid-body transformation matrix $m_{2,h}$ is that which expresses a rotation about the nipple position. The rigid-body transformation matrix $m_{2,h}$ can be calculated by a known method such as an ICP (Iterative Closest Point) method.

In this processing step, the deformation coefficient calculation unit 1120 calculates each provisional model shape $x''_h$ using the rigid-body transformation matrices $m_{1,h}$ and $m_{2,h}$. Also, the deformation coefficient calculation unit 1120 calculates a distance (residual error) $e_{rigid,h}$ between the midline of each provisional model shape $x''_h$ and that of the target case, and records it in the main memory 212.

(3-4) Calculate Evaluation Function (Step S4230)

In this processing step, the deformation coefficient calculation unit 1120 calculates, based on the provisional model shapes $x''_h$ and the body surface shape and nipple position of the target case (step S410), an evaluation value using an evaluation function given by:

$$e_h = e_{prone\_surface,h} + e_{supine\_surface,h} + e_{supine\_nipple,h} + e_{rigid,h} \quad (9)$$

Note that the evaluation function is a function required to evaluate a degree of matching between each provisional model shape $x''_h$ and the body surface shape and nipple position of the target case.

Initially, the deformation coefficient calculation unit 1120 calculates an evaluation value $e_{prone\_surface,h}$ related to a degree of matching between each provisional model shape $x''_h$ and the body surface at the prone position of the target case. This processing can be implemented by, for example, conducting a nearest neighbor search from respective node positions which express the body surface at the prone position in each provisional model shape $x''_h$ to the body surface shape at the prone position of the target case and calculating an average of distances to the nearest neighbor body surface.

Next, the deformation coefficient calculation unit 1120 calculates an evaluation value $e_{supine\_surface,h}$ related to a degree of matching between each provisional model shape $x''_h$ and the body surface at the supine position of the target case. This processing can be implemented by, for example, conducting a nearest neighbor search from respective node positions which express the body surface at the supine position in each provisional model shape $x''_h$ to the body surface shape at the supine position of the target case and calculating an average of distances to the nearest neighbor body surface.

Furthermore, the deformation coefficient calculation unit 1120 calculates an evaluation value $e_{supine\_nipple,h}$ related to a degree of matching between each provisional model shape $x''_h$ and the nipple position at the supine position of the target case. This processing can be implemented by calculating a distance between a node position which represents the nipple at the supine position in the provisional model shape $x''_h$ and the nipple position at the supine position of the target case. Then, as given by equation (9), the evaluation function is generated using the calculated evaluation values and residual errors related to the midline positions (step S4220), thereby calculating evaluation values $e_h$.

(3-5) Optimization End Determination (Step S4240)

In this processing step, the deformation coefficient calculation unit 1120 determines whether or not to end the processing of step S420. This determination is made based on the H evaluation values $e_h$ by, for example, the following processing. Initially, the deformation coefficient calculation unit 1120 selects smallest one of the H evaluation values $e_h$. The deformation coefficient calculation unit 1120 records the selected value as $e_{opt}$ in the main memory 212. Also, the deformation coefficient calculation unit 1120 selects a coefficient of the corresponding statistical model from the coefficient variation candidates $c''_h$, and records it as $c_{opt}$ in the main memory 212. Likewise, as for the rigid-body transformations, the deformation coefficient calculation unit 1120 selects matrices $m_{1,opt}$ and $m_{2,opt}$ and records them in the main memory 212. If $e_{opt}$ is smaller than a predetermined threshold, the processing of step S420 is to end. Otherwise, the deformation coefficient calculation unit 1120 sets $c_{opt}$ as new c', and the process returns to step S4210.

In this way, when the deformation coefficient calculation unit 1120 calculates an optimal deformation coefficient, it ends the processing of step S420. However, when an optimal deformation coefficient is not calculated, the deformation coefficient calculation unit 1120 repeats the processing so as to calculate a better deformation coefficient.

The determination method to repeat the processing is not limited to the aforementioned example. For example, when the loop processing of steps S4210 to S4240 is complete a plurality of times, if the currently calculated evaluation value is much smaller than a predetermined threshold compared to the previously selected evaluation value, the processing of step S420 may end. On the other hand, when a decreasing ratio from the previously selected evaluation value to the currently selected evaluation value is smaller than a predetermined threshold, the processing of step S420 may end. When the loop processing is executed a predetermined number of times or more, the processing of step S420 may end. That is, known abort processing related to nonlinear optimization can be used.

Note that the aforementioned method of the deformation coefficient calculation method is an example of the embodiment of the present invention, and other methods may be used. For example, the coefficient optimization processing of step S420 can be considered as a nonlinear problem with respect to the evaluation function given by equation (9). Therefore, this can be replaced by other known nonlinear optimization methods. That is, a random sampling method, steepest descent method, Newton method, simulated annealing method, genetic algorithm (GA) method, and the like may be used. For example, using a deformation coefficient calculated by the random sampling method as an initial value, the steepest descent method may be executed based on that initial value. Also, after the GA method, the steepest descent method or Newton method may be used. Alternatively, a coarse-to-fine search of the deformation coefficient may be conducted.

(4) Calculate Deformation Field (Step S430)

In this processing step, the transformed image generation unit 1130 calculates a deformation field of the target case based on the statistical model (step S340) and the deformation coefficient (step S420). Note that the deformation field is that from the prone position to the supine position of the breast of the target case. More specifically, the transformed image generation unit 1130 calculates:

$$x_{opt} = x_{average} + Ec_{opt} \qquad (10)$$

Next, the transformed image generation unit 1130 decomposes a vector $x_{opt}$ calculated using equation (10) into 2×M three-dimensional vectors. Then, the transformed image generation unit 1130 transforms these three-dimensional coordinate vectors using the rigid-body transformation matrices $m_{1,opt}$ and $m_{2,opt}$ (step S420). In this case, first to M-th M three-dimensional coordinate vectors represent node position of meshes corresponding to the breast at the prone position of the target case. Also, (M+1)-th to (2×M)-th M three-dimensional coordinate vectors represent node positions of meshes corresponding to the breast at the supine position of the target case. Then, the j-th (1≤j≤M) prone node position and (j+M)-th supine node position express estimations corresponding to an identical area of the target case. That is, a difference from these three-dimensional vectors represents a deformation estimation value from the prone position to the supine position of the target case.

In this processing step, the transformed image generation unit 1130 further calculates a deformation field from the prone position to the supine position of the target case based on the 2×M three-dimensional coordinate vectors of the node positions to which the rigid-body transformations are applied. This processing is executed based on information related to node connections recorded in the mesh generation processing executed in step S320. That is, for each mesh element, using information of positions of eight nodes which form that element, a displacement inside the mesh element is calculated by linear interpolation or the like. This method can be executed by a known method related to a deformation expression using a mesh model. As a result, a function $f_{opt}$ which expresses a deformation related to the target case is calculated. Note that the function $f_{opt}$ is that having the same format as the deformation expression related to case data described in step S310. That is, this function represents a deformation into three-dimensional image coordinates of the supine position of the target case using three-dimensional image coordinates of the prone position of the target case as an argument. In this processing step, the transformed image generation unit 1130 records the calculated function $f_{opt}$ in the main memory 212.

(5) Generate Observation Image (Step S440)

In this processing step, the observation image generation unit 1140 generates an observation image used to present the correspondence relationship between the prone and supine images of the target case. Then, the observation image generation unit 1140 displays that image on the monitor 160.

In this processing step, the observation image generation unit 1140 initially displays the prone image on the monitor 160. Then, the observation image generation unit 1140 obtains a region of interest in that image from a user's input operation or the like. Let $x_{proi}$ be an image coordinate value in the prone image of the region of interest. Then, this coordinate value is transformed into an image coordinate value $x_{sroi}$ of a corresponding region in the supine image of the target case using the function $f_{opt}$ (step S430). That is, the observation image generation unit 1140 calculates:

$$x_{sroi} = f_{opt}(x_{proi}) \qquad (11)$$

Then, the observation image generation unit 1140 displays the supine image of the target case on the monitor 160, and superimposes a mark or the like, which can be visually confirmed by the user, at the position of the calculated image coordinate value $x_{sroi}$. In this way, a region corresponding to the region of interest selected by the user on the prone image is presented on the supine image.

Note that the image coordinate value $x_{proi}$ of the region of interest on the prone image need not always be obtained by a user's input operation. For example, the user may detect a suspected lesion position by image processing of the prone image, and may select that position as $x_{proi}$. Also, in the example of the above description, the corresponding image coordinate value of the supine image is calculated from the image coordinate value of the prone image. Alternatively, processing opposite to the above case may be executed. That is, the corresponding image coordinate value of the prone image may be calculated from the image coordinate value of the supine image.

In this way, with the processes of steps S400 to S440, the deformation estimation phase processing of this embodiment is executed. The processing of the processing apparatus 100 of the first embodiment has been described. According to the first embodiment, a mechanism which can present correspondence between positions of the prone image and supine image of the target case can be provided.

(Modification 1-1)

The first embodiment has exemplified the case in which the deformation estimation phase processing is executed using the statistical model generated in the learning phase. However, the present invention is not limited to such specific embodiment. For example, the processing apparatus 100 may derive a statistical model by the learning phase processing, and may record it in the main memory 212 or the like. At this time, the processing apparatus 100 need not always include a function of executing the deformation estimation phase processing. Then, another processing apparatus loads the recorded statistical model to execute the deformation estimation phase processing. This another processing apparatus may load the recorded statistical model, and may execute the deformation estimation phase processing based on the loaded model.

(Modification 1-2)

The first embodiment has exemplified the case in which the learning phase processing derives a single statistical model. However, the present invention is not limited to such specific embodiment. For example, cases may be classified into a plurality of groups based on sizes and shape features, and the like of breasts and the like, and a plurality of statistical models may be derived based on cases for respective groups. In this case, the deformation estimation phase can select and use an appropriate statistical model from the plurality of statistical models based on attributes such as size and shape features of a breast of the target case. Using this method, since the statistical model based on a case, size and shape features of a breast of which are close to those of the target case, can be used, thus improving the deformation estimation precision. Alternatively, since the statistical model based on case data, these features of which are close to each other, can be used, appropriate deformation estimation can be done using a smaller number D of principal components, thus improving the processing efficiency.

Note that the attributes described as criteria of grouping of cases are merely examples. Therefore, grouping can also be done based on attributes such as a ratio or quantities of mammary gland included in a breast, and an age, race, resident area, disease name, health history, and the like of a subject. In either case, the same effect as the above case can be expected.

Also, grouping may follow the predetermined method, as described above, or other methods. More specifically, after a plurality of case data are obtained, an appropriate grouping method may be selected, and grouping may be applied. Alternatively, the number of groups may be varied or advisability of grouping may be decided based on the total number of case data.

Grouping borders may be determined based on a distribution of breast sizes or the like of cases included in the case data. In this manner, grouping can be adaptively executed according to the number of case data, a distribution of features of breasts included in case data, and the like.

Therefore, when case data are obtained by connecting to a hospital information system or the like, appropriate statistical models according to the number of case data and the like can be derived. In this way, the deformation estimation precision and processing efficiency can be improved.

(Modification 1-3)

The first embodiment has exemplified the case in which the statistical model having the unique number D of principal components is derived in the learning phase. However, the present invention is not limited to such specific embodiment.

For example, in the processing to be executed in the learning phase, the number of principal components may be variously changed to generate statistical models for respective numbers of principal components. In this case, the deformation estimation phase executes processing using a statistical model of the smallest number of principal components of the plurality of statistical models. Then, the processing is executed using the second smallest number of principal components. At this time, an initial value of the coefficient to be set in step S4200 can use the execution result of the deformation estimation phase using the statistical model of the smallest number of principal components.

With this modification, the deformation estimation phase processing using the statistical model of the larger number of principal components can hardly fall into a local solution. For this reason, high deformation estimation precision and stability can be assured. Also, the efficiency of the deformation estimation processing can be improved.

(Modification 1-4)

The first embodiment has exemplified the case in which a right breast of a human body is used as a target in the learning phase and deformation estimation phase. However, the present invention is not limited to such specific embodiment. For example, in the learning phase, right and left breasts of case data may be independently processed to derive respective statistical models. In this case, the statistical model is selectively used depending on whether a target breast which is to undergo deformation estimation in the deformation estimation phase is a right or left breast.

Thus, the deformation estimations corresponding to right and left breasts can be executed. Also, right and left breasts of a human body have nearly symmetric shapes and deformation characteristics. For this reason, a statistical model generated based on right or left breasts in the learning phase may be symmetrically transformed and may be used in the deformation estimation phase. That is, in the deformation estimation phase, deformation of the right or left breast can be estimated using the symmetrically transformed statistical model. According to this modification, using only right or left data as case data, deformation estimations targeted at both right and left breasts can be executed.

When case data of both right and left breasts are used as case data, the aforementioned symmetry can be used. That is, by symmetrically transforming right or left case data, statistical models can be derived all case data. For example, case data of left breasts included in case data are symmetrically transformed, and the transformed data can be used as right breast data. According to this modification, case data can be efficiently generated from a small number of cases. Also, when the number of cases which can be used as case data is limited, more precise deformation estimation can be executed.

(Modification 1-5)

The first embodiment has exemplified the case in which zero vector is set as the initial value of the coefficient of the statistical model. However, the present invention is not limited to such specific embodiment. For example, one of coefficients $c_i$ ($1 \leq i \leq N$) related to respective case data calculated in step S350 may be used.

In this case, case data having a shape similar to the target case may be selected, and a coefficient corresponding to that case data may be used as an initial value. According to this modification, the initial value of the deformation coefficient can be expected to assume a value closer to a correct solution. Also, the deformation coefficient estimation processing can be expected to be efficiently executed. As a method of selecting case data having a shape similar to the target case, the following method may be used. That is, a method of selecting case data by comparing the body surface shape of the target case (step S410) and that of case data (step S3200) to evaluate their similarity may be used.

In addition, as another method, the user selects case data, and a coefficient corresponding to that case data is set as an initial value. This method can be implemented by displaying an image of the target case and a plurality of images of cases data on the monitor 160 and selecting case data having a shape similar to a target shape by the user.

Second Embodiment

Overview of Second Embodiment

A processing apparatus according to this embodiment displays a correspondence relationship between an MRI image captured at a prone position and an ultrasonic image captured at a supine position in association with an unknown case to allow the user to visually recognize it. Note that a statistical model generated in a learning phase similar to that in the first embodiment is used.

[Functional Arrangement]

Figure 13:
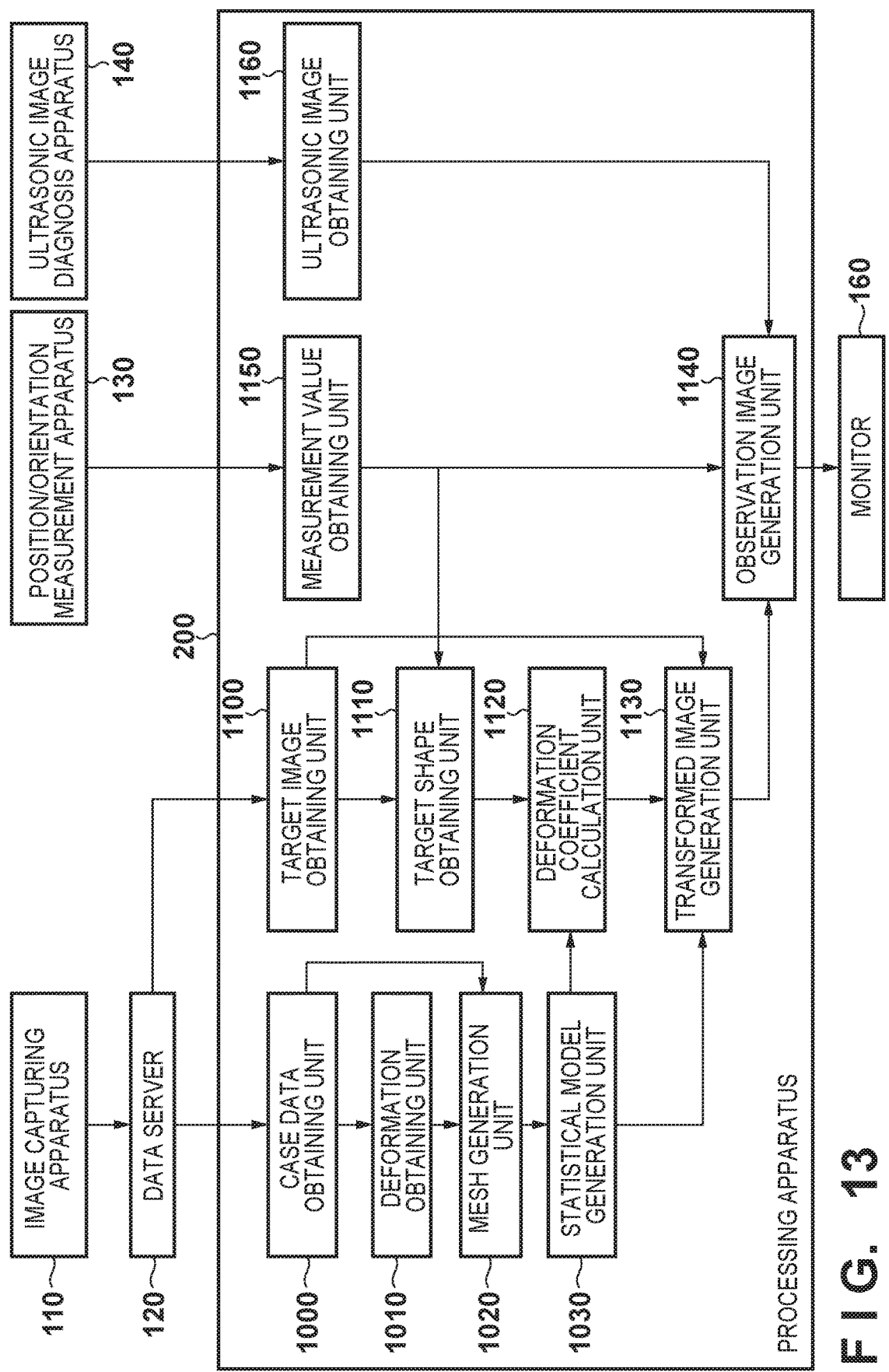
FIG. 13 is a block diagram showing the functional arrangement of a processing system according to the second embodiment.

FIG. 13 is a block diagram showing the arrangement of a processing system according to this embodiment. In this embodiment, the same reference numerals as in FIG. 1 denote components having the same functions as those in the first embodiment, and a description thereof will not be repeated.

A processing apparatus 200 of this embodiment is further connected to a position/orientation measurement apparatus 130 and ultrasonic image diagnosis apparatus 140 compared to FIG. 1. Also, the processing apparatus 200 includes a prone image obtaining unit 1170, transformed image generation unit 1130, measurement value obtaining unit 1150, and ultrasonic image obtaining unit 1160. The ultrasonic image diagnosis or ultrasonic imaging apparatus 140 brings an ultrasonic probe (not shown) into contact with a subject to capture an ultrasonic image inside the subject. The ultrasonic imaging apparatus 140 captures a two-dimensional B-mode ultrasonic image of a sectional region of the subject.

The position/orientation measurement apparatus 130 measures a position and orientation of the ultrasonic probe on a three-dimensional space. This apparatus is configured by attaching a magnetic or optical 6-degree-of-freedom measurement device to the ultrasonic probe. Note that the position and orientation of the ultrasonic probe mean relative position and orientation relationships between a probe coordinate system and sensor coordinate system. The probe coordinate system and sensor coordinate system will be described below. Note that position and orientation measurement values of the ultrasonic probe will be referred to as probe measurement values hereinafter.

The probe coordinate system is an orthogonal coordinate system which is defined with reference to the ultrasonic probe. Also, the probe coordinate system has, as an origin, the center of an imaging surface (a surface contacting a subject) of the ultrasonic probe. A radiation direction of an ultrasonic beam is defined as a Y axis, and a direction perpendicular to the Y axis is defined as an X axis. Assume that the X axis is included in the imaging surface of an ultrasonic image captured by the ultrasonic imaging apparatus 140. A direction of an outer product of the X and Y axes is defined as a Z axis.

The sensor coordinate system is an orthogonal coordinate system which is defined as a reference by the position/ orientation measurement apparatus 130. For example, a measurement station (not shown) which is fixed on a three-dimensional space on which measurements are done is used as a reference. The measurement value obtaining unit 1150 obtains probe measurement values measured by the position/ orientation measurement apparatus 130 as a rigid-body transformation matrix of 4 rows×4 columns, which matrix is expressed by a translation and rotation. However, the measurement values are obtained with reference to the sensor coordinate system. The ultrasonic image obtaining unit 1160 obtains an ultrasonic image obtained by capturing an interior of a subject using an ultrasonic beam by the ultrasonic imaging apparatus 140.

[Processing Sequence]

The overall operation to be executed by the processing apparatus 200 will be described below. In this embodiment, processing is implemented when a CPU 211 executes a program stored in a main memory 212. Results of processes (to be described below) executed by the processing apparatus 200 are stored and recorded in the main memory 212. The processing of the processing apparatus 200 of this embodiment includes learning phase and deformation estimation phase processes as in the first embodiment. Since the learning phase processing of this embodiment is the same as that in steps S300 to S350 (FIG. 3) of the first embodiment, a description thereof will not be repeated.

Figure 14:
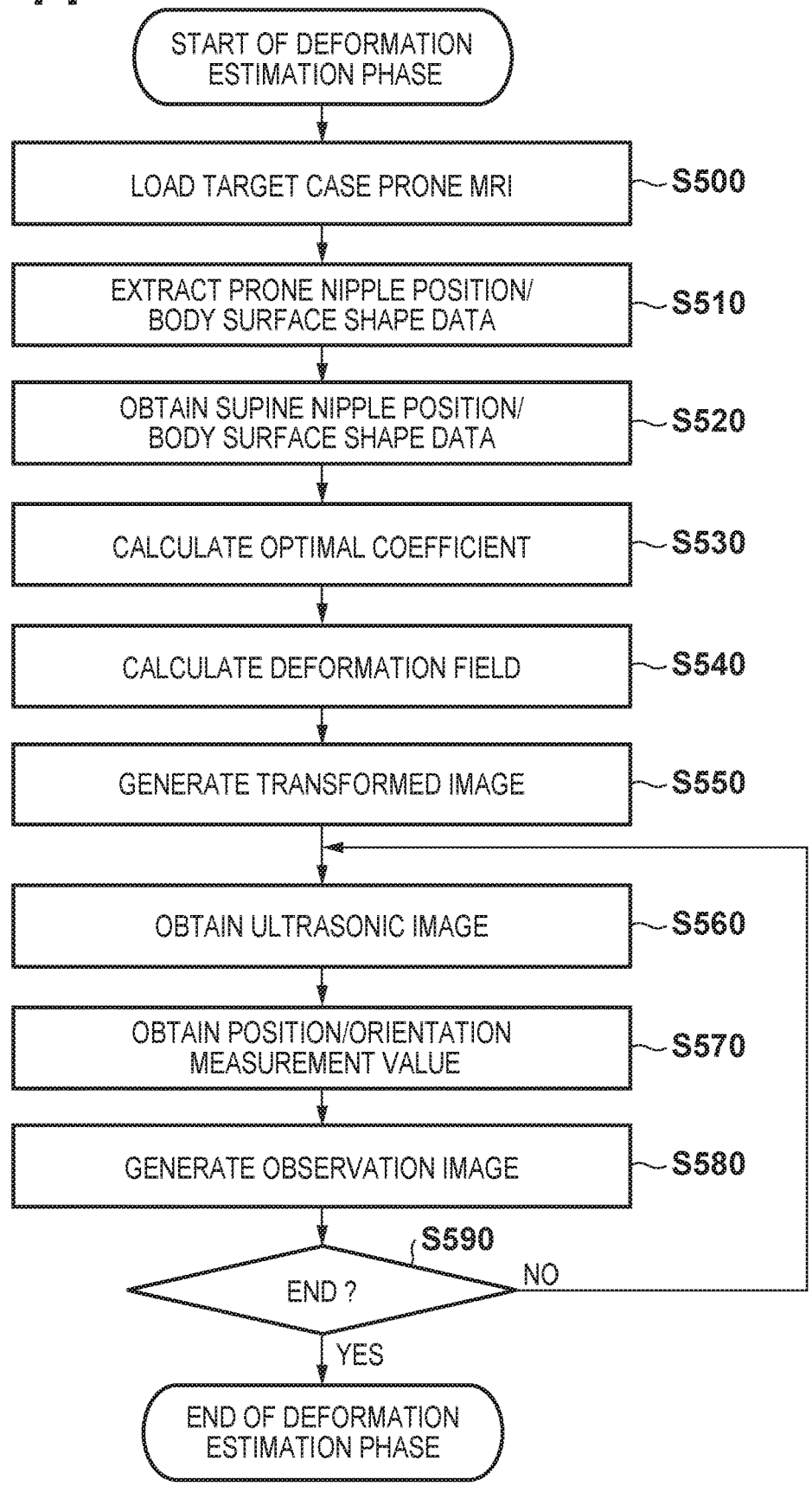
FIG. 14 is a flowchart of the deformation estimation phase processing of the processing apparatus according to the second embodiment.

The deformation estimation phase processing according to this embodiment will be described in detail below with reference to the flowchart shown in FIG. 14. Note that the measurement value obtaining unit 1150 sequentially obtains probe measurement values measured by the position/orientation measurement apparatus 130 independently of processing steps. Then, the measurement value obtaining unit 1150 holds the measurement values, and outputs the latest measurement values in response to requests from other processing units.

Note that the probe measurement values obtained by the measurement value obtaining unit 1150 are those on the sensor coordinate system intact. However, this embodiment uses values obtained by applying predetermined coordinate transformation to the measurement values. That is, coordinate transformation to a coordinate system (human body coordinate system) with reference to a body of a target case is applied.

A reference coordinate system can be defined as follows. That is, the reference coordinate system has, as an origin, a distal end position of an ensiform cartilage as a lower end position of a body of sternum of the target case, a body side direction of the target case is defined as an X axis, a back-and-forth direction is defined as a Y axis, a body axis direction is defined as a Z axis, and so forth. The coordinate transformation can be executed based on the probe measurement values when the ultrasonic image diagnosis apparatus 140 extracts, for example, the distal end position of the ensiform cartilage. Since this processing can be implemented by a known technique, a detailed description thereof will not be given. Thus, the measurement value obtaining unit 1150 obtains the probe measurement values with reference to the human body coordinate system.

The ultrasonic image obtaining unit 1160 sequentially obtains and holds ultrasonic images captured by the ultrasonic imaging apparatus 140 independently of processing steps. Also, the ultrasonic image obtaining unit 1160 outputs a latest ultrasonic image in response to requests from other processing units.

(1) Obtain Prone Image of Target Case (Step S500)

In this processing step, a target image obtaining unit 1100 obtains a prone image of the target case from a data server 120. In this case, the image to be obtained is that with reference to a coordinate system defined by an image capturing apparatus intact. However, this embodiment uses a value obtained by applying, to this image, coordinate transformation into the human body coordinate system as in the above description. This coordinate transformation can be executed based on, for example, the distal end position of the ensiform cartilage of the subject included in the prone image. Since this processing can be implemented by a known technique, a detailed description thereof will not be given.

(2) Extract Prone Nipple Position/Body Surface Shape Data (Step S510)

In this processing step, a shape obtaining unit 1110 extracts a prone nipple position and body surface shape based on the obtained image of the target case. This processing is the same as that in step S410 described in the first embodiment. As a result, a three-dimensional coordinate value of the prone nipple position and information such as a point group or implicit function which expresses the body surface shape are obtained.

(3) Obtain Supine Nipple Position/Body Surface Shape Data (Step S520)

In this processing step, the shape obtaining unit 1110 obtains a body surface shape and nipple position at the supine position of the target case based on the measurement values by the measurement value obtaining unit 1150. For example, this processing is executed as follows. Initially, the user holds the ultrasonic probe so that its imaging surface center contacts a nipple position of the target case. Then, the shape obtaining unit 1110 obtains latest measurement values obtained by the measurement value obtaining unit 1150 upon obtaining a user's execution instruction. Then, the shape obtaining unit 1110 records the central position of the imaging surface of the ultrasonic probe as the supine nipple position of the target case.

Likewise, a body surface shape at the supine position of the target case can also be obtained. That is, the shape obtaining unit 1110 obtains a position of a body surface at the supine position of the target case by holding the ultrasonic probe and obtaining latest measurement values, as described above. Then, the shape obtaining unit 1110 repeats this processing for a plurality of different body surface positions, thereby obtaining the plurality of body surface positions which express a body surface shape.

In the example of the above description, the ultrasonic probe is used. However, the present invention is not limited to such specific embodiment. For example, the position/orientation measurement apparatus 130 measures a position of an arbitrary object such as a stylus, and brings that object into contact with the positions of the body surface and nipple of the target case, thus obtaining the body surface shape and nipple position of the target case.

(4) Calculate Optimal Deformation Coefficient (Step S530)

In this processing step, the processing apparatus 200 calculates a coefficient of a statistical model and rigid-body transformation as an optimal deformation coefficient based on the prone body surface shape and the like (step S510) and supine body surface shape and the like (step S520). This processing is the same as that in step S420 of the first embodiment. However, the first embodiment uses values at both the prone and supine positions obtained based on images obtained by the target image obtaining unit 1100 (FIG. 1), but this embodiment has the following difference. That is, in this embodiment, information at the prone position is obtained in the same manner as in the first embodiment, but values measured by bringing the ultrasonic probe into contact with the subject are obtained as information of the supine body surface shape and the like of the target case, and these values are used.

(5) Calculate Deformation Field (Step S540)

In this processing step, the processing apparatus 200 executes the same processing as in step S430 of the first embodiment to calculate a deformation field of the target case. That is, the processing apparatus 200 calculates a function $f_{opt}$ which expresses a deformation related to the target case.

(6) Generate Transformed Image (Step S550)

In this processing step, the transformed image generation unit 1130 transforms the prone image (step S500) using the function $f_{opt}$ (step S550), thus generating a transformed image. Note that the transformed image is an image which spatially matches the target case. Practical processing for generating a transformed image will be described below.

The prone image (step S500) of the target case is expressed by $I_{prone}(x, y, z)$ in a function format. This function inputs a coordinate value on the human body coordinate system as an argument, and returns a pixel value (intensity value) of an image. A transformed image to be generated in this processing step is also described by $I_{deformed}(x, y, z)$ in the same format as the above function. The transformed image uses the human body coordinate system as a reference as in the prone image. However, in an area to be deformed due to orientation change from the prone position to the supine position of the target case, coordinate transformation is required. Information related to this coordinate transformation is based on the function $f_{opt}$ calculated in step S550. That is, the transformed image is generated by executing, for pixels which form that image, a calculation given by:

$$I_{deformed}(x,y,z)=I_{prone}(f_{opt}^{-1}(x,y,z)) \qquad (12)$$

where $f^{-1}_{opt}$ is an inverse function of the function $f_{opt}$, and a deformation field from the supine position to the prone position of the target case. $f^{-1}_{opt}$ can be calculated based on $f_{opt}$ in an exploratory manner. In the same manner as in step S550, the calculation may be executed while replacing node positions related to the prone and supine positions. With the aforementioned processing, the transformed image $I_{deformed}(x, y, z)$ is generated.

Processes of steps S560 to S590 of this embodiment will be described below. Note that the processes of steps S560 to S590 of this embodiment may be repetitively executed a plurality of times based on a branch judgment result in the process of step S590.

(7) Obtain Ultrasonic Image (Step S560)

In this processing step, the ultrasonic image obtaining unit 1160 obtains an ultrasonic image by capturing a breast of the subject in a supine state by the ultrasonic imaging apparatus 140. The ultrasonic image is that obtained by capturing the target case at the supine position using an ultrasonic beam, and is a two-dimensional B-mode image in this embodiment.

(8) Obtain Position/Orientation Measurement Value (Step S570)

In this processing step, the measurement value obtaining unit 1150 obtains probe measurement values at the capturing timing of the ultrasonic image (step S560). The measurement value obtaining unit 1150 of this embodiment obtains measurement vales on the human body coordinate system. Assume that an image coordinate system of the ultrasonic image obtained in step S570 in this embodiment matches the aforementioned probe coordinate system (a Z=0 plane thereof).

(9) Generate Observation Image (Step S580)

In this processing step, the observation image generation unit 1140 generates an observation image based on the ultrasonic image (step S560), probe measurement values (step S570), and transformed image (step S550). Note that the observation image is presented by the processing apparatus 200 to the user via a monitor 160. That is, the observation image allows the user to easily compare and observe the prone image (step S500) and ultrasonic image (step S560) of the target case.

Practical processing for generating the observation image will be described below. A captured region on the probe coordinate system is obtained from the ultrasonic image with reference to the probe coordinate system. For example, when the ultrasonic image is a rectangle, coordinate values of its four corners are obtained. Next, these coordinate values of the four corners are transformed into coordinate values with reference to the human body coordinate system based on the probe measurement values (step S570). Then, a rectangular region on the human body coordinate system, which region connects these coordinate values of the four corners, is generated. A corresponding slice image is generated by extracting the pixels of the rectangular region from the transformed image (step S550). Then, the observation image is generated by comparing this corresponding slice image and the ultrasonic image (step S560), and is displayed on the monitor 160 or the like. A practical example of the observation image includes an image including the corresponding slice image and ultrasonic image arranged side by side, or an image obtained by superimposing one image on the other image, and the like.

Thus, the observation image, which allows the user to compare and observe the ultrasonic image and an image obtained by capturing nearly the same region of the target case, the ultrasonic image of which was captured, is generated. The observation image generated by the aforementioned processing is transmitted to a display memory 214, and is displayed on the monitor 160.

(10) End Determination (Step S590)

In this processing step, the user determines whether or not to end the processing of the processing apparatus 200. If the user determines to end the processing, the processing ends; otherwise, the process returns to step S560. This determination can be made based on a user's input operation. When the process returns to step S560, an ultrasonic image of a different region of the target case is captured and obtained. Then, an observation image is generated accordingly. When the processes of steps S560 to S590 are repeated at high speed, an observation image is displayed to follow a user's operation or the like.

According to the aforementioned second embodiment of the present invention, an image of the target case captured in a prone state is transformed to nearly match an ultrasonic image of the target case at the supine position. Then, a prone image, which is transformed in a state that can be easily compared with the supine ultrasonic image, is presented. Therefore, the ultrasonic image and (MRI) image of the target case can be displayed in a mode that allows the user to easily associate spatial positions with each other.

(Modification 2-1)

This embodiment has exemplified the case in which the user brings the ultrasonic probe into contact with the target case, and measurement values at that time are used. However, the present invention is not limited to such specific embodiment. For example, the processing apparatus 200 can be connected to a range sensor which can measure the body surface shape and the like of the target case in a non-contact manner. In this case, the body surface shape and nipple position of the target case can be obtained based on measurement values of the range sensor. According to this modification, since the body surface shape and nipple position of the target case can be obtained without operating the ultrasonic probe, the user can use the processing apparatus 200 more easily.

Third Embodiment

Overview of Third Embodiment

A processing apparatus according to this embodiment automatically executes processing of step S310 executed by the processing apparatus described in the first embodiment. Thus, input processing of the user is reduced, thus allowing the user to use the processing apparatus more easily.

[Functional Arrangement]

Figure 15:
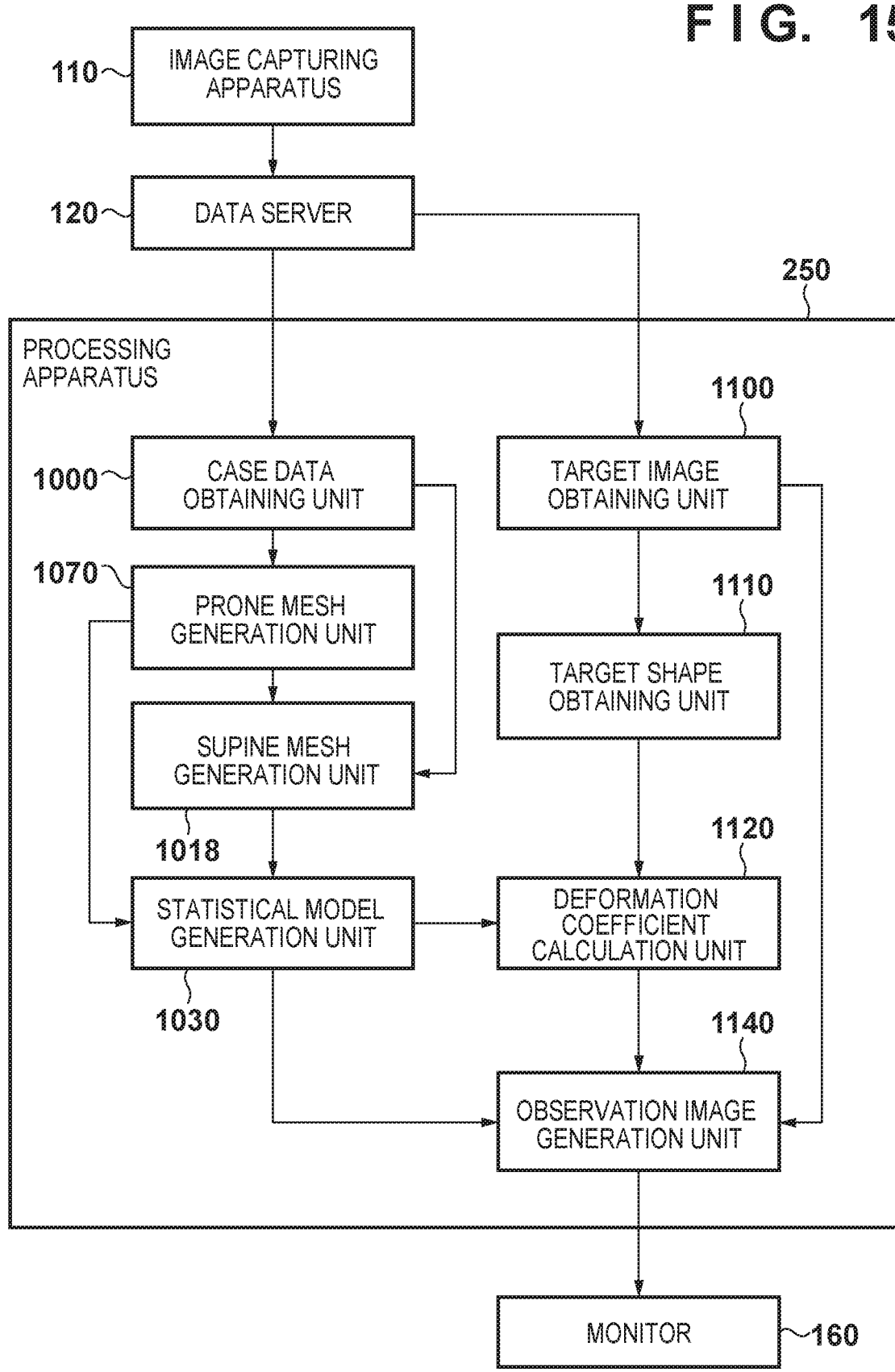
FIG. 15 is a block diagram showing the functional arrangement of a processing system according to the third embodiment.

FIG. 15 is a block diagram showing the arrangement of a processing system according to this embodiment. In this embodiment, the same reference numerals as in FIG. 1 denote components having the same functions as those in the first embodiment, and a description thereof will not be repeated. A processing apparatus 250 of this embodiment includes a prone mesh generation unit 1170 and supine mesh generation unit 1180.

The prone mesh generation unit 1170 generates prone meshes related to breasts of respective cases based on case data obtained by a case data obtaining unit 1000. The supine mesh generation unit 1180 generates supine meshes related to breasts of respective cases based on the case data obtained by the case data obtaining unit 1000 and the prone meshes generated by the prone mesh generation unit 1170.

[Processing Sequence]

Figure 16:
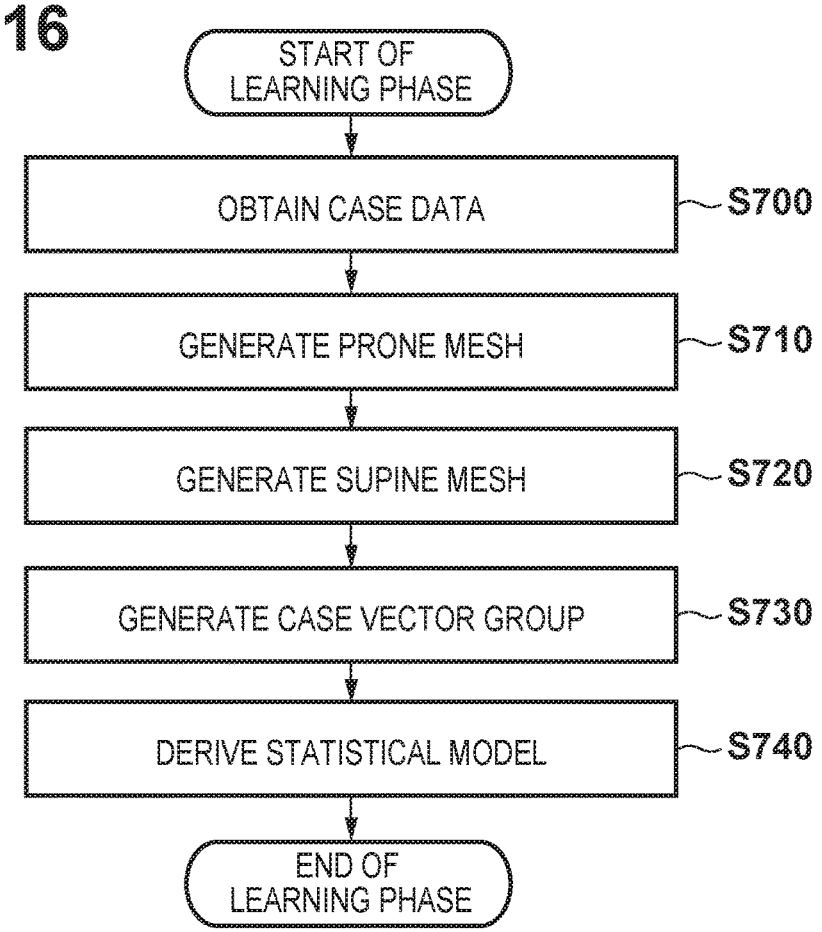
FIG. 16 is a flowchart showing the learning phase processing sequence according to the third embodiment.

The processing apparatus 250 according to this embodiment executes learning phase processing and deformation estimation phase processing as in the processing apparatus of the first embodiment. Note that the deformation estimation phase processing in this embodiment is the same as that of the first embodiment, and a description thereof will not be repeated. Only the learning phase processing will be described below with reference to FIG. 16.

(1) Obtain Case Data (Step S700)

In this processing step, the case data obtaining unit 1000 executes the same processing as that in step S300 of the first embodiment.

(2) Generate Prone Mesh (Step S710)

In this processing step, the prone mesh generation unit 1170 generates a mesh structure in a prone image (step S700) of each case data. This processing is executed by the same processing as that of step S320 to be executed by the mesh generation unit 1020 in the first embodiment.

(3) Generate Supine Mesh (Step S720)

Figure 17:
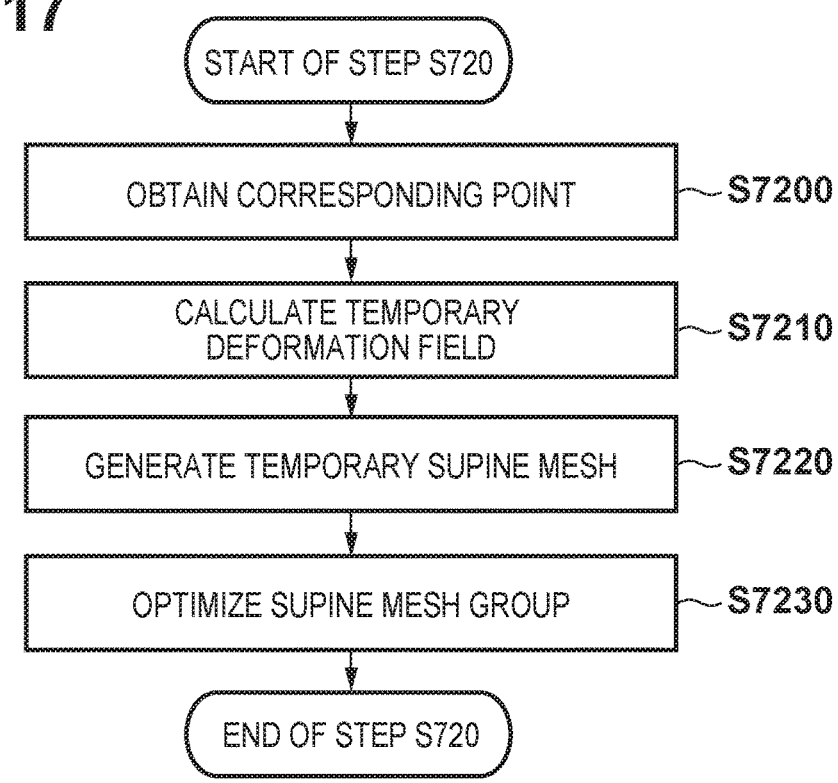
FIG. 17 is a flowchart showing the processing sequence of step S720 of a processing apparatus according to the third embodiment.

In this processing step, the supine mesh generation unit 1180 automatically generates supine meshes based on the case data (step S700) and the prone meshes (step S710). An example of the supine mesh generation method will be described below with reference to FIG. 17.

(3-1) Obtain Corresponding Point (Step S7200)

In this processing step, the supine mesh generation unit 1180 extracts a plurality of corresponding points from the prone image and supine image included in each case data (step S700), and associates the plurality of corresponding points with each other. This method can be executed by a known technique such as an n-SIFT method described in, for example, Reference 3 (Warren Cheung, Ghassan Hamarneh, "N-SIFT: N-Dimensional scale invariant feature transform for matching medical images," 4th IEEE International Symposium on Biomedical Imaging: From Nano to Macro, 2007.)

(3-2) Calculate Temporary Deformation Field (Step S7210)

In this processing step, the supine mesh generation unit 1180 generates a temporary deformation field from the prone image to the supine image based on information of positions of the plurality of corresponding points (step S7200). This processing is executed by the same processing as that in step S3110 of the first embodiment.

(3-3) Generate Temporary Supine Mesh (Step S7220)

In this processing step, the supine mesh generation unit 1180 generates nodes of a temporary supine mesh obtained by transforming positions of nodes which form the prone mesh (step S710) based on the temporary deformation field (step S7220). This processing is executed by the same processing as that in step S330 of the first embodiment.

(3-4) Optimize Supine Mesh Group (Step S7230)

In this processing step, the supine mesh generation unit 1180 executes processing for optimizing the temporary supine mesh to more appropriate one based on the case data (step S700) and the temporary supine mesh (step S7220).

For example, this processing is executed as follows. Initially, the supine mesh generation unit 1180 generates a plurality of meshes by slightly changing positions of nodes which form the temporary supine mesh. Note that these meshes will be referred to as supine mesh candidate groups. Then, the supine mesh generation unit 1180 calculates evaluation values respectively for the supine mesh candidate groups. A method of calculating the evaluation values will be described later. Based on the evaluation values respectively calculated for the plurality of supine mesh candidate groups, the supine mesh generation unit 1180 selects a mesh with the highest evaluation value. Then, the supine mesh generation unit 1180 records the selected mesh as an optimized supine mesh.

Also, in this processing step, the supine mesh generation unit 1180 may repetitively execute the aforementioned processing. At this time, in the second or subsequent processing, the supine mesh generation unit 1180 can use the supine mesh recorded as the immediately preceding processing result in place of the temporary supine mesh. That is, this processing step can update the temporary supine mesh to increase its evaluation value. Thus, the supine mesh can be generated precisely.

An example of the evaluation value calculation method will be described below. Initially, the supine mesh generation unit 1180 calculates candidate groups of deformation fields based on the prone mesh (step S710) and respective meshes of the supine mesh candidate groups (step S7230). This processing is executed based on information related to node connections recorded in the mesh generation processing executed in step S710. That is, for each mesh element, using information of positions of eight nodes which form that element, a displacement inside the mesh element is calculated by linear interpolation or the like. This method can be executed by a known method related to a deformation expression using a mesh model. As a result, deformation fields are calculated respectively for the supine mesh candidate groups. In this case, these deformation fields will be referred to as deformation field candidate groups hereinafter.

For each of the deformation field candidate groups, the following processing is executed. That is, transformed image candidate groups are generated by transforming the prone image of each case data (step S700) based on the deformation field candidate groups, respectively. This processing is executed by the same processing as in step S560.

Then, image similarities between the supine images of the case data (step S700) and generated transformed image candidate groups are calculated. The image similarity can be calculated by known methods such as a method of calculating a similarity based on an accumulated value of differences between pixel values of two images, a method of calculating a similarity using mutual information amounts of pixel values of two images, and so forth. Note that the image similarity is a scalar value, and assumes a larger value to indicate that two images are similar to each other. The image similarities calculated by the aforementioned processing are used as evaluation values respectively for the supine mesh candidate groups.

(4) Generate Case Vector Group (Step S730)

In this processing step, a statistical model generation unit 1030 executes the same processing as in step S350 of the first embodiment. A description of this step will not be repeated.

With the processes of steps S700 to S740 described above, the learning phase processing of this embodiment is executed.

According to the processing apparatus of this embodiment, in the learning phase processing, a supine mesh corresponding to a prone mesh can be semi-automatically generated based on pixel values of images of the case data and the like. Therefore, troublesome of user's input operations can be reduced, and the user can execute deformation estimation of the target case more easily.

Fourth Embodiment

Overview of Fourth Embodiment

A processing apparatus of this embodiment generates, as multi-level models, a statistical model generated by the processing apparatus of the first embodiment as learning phase processing. Then, in a deformation estimation phase, deformation estimation of a target case is executed using the multi-level statistical models. Thus, the deformation estimation precision of the target case and calculation efficiency can be improved.

[Functional Arrangement]

The arrangement of a processing system according to this embodiment is the same as that of the first embodiment shown in FIG. 1, and a description thereof will not be repeated.

[Processing Sequence]

The overall operation to be executed by the processing apparatus of this embodiment can be explained using FIGS. 3 and 4 which are used to explain the overall operation to be executed by the processing apparatus of the first embodiment.

Learning phase processing to be executed by the processing apparatus of this embodiment will be described first with reference to FIG. 3. Since processes of steps S300 to S330 are the same as those in the first embodiment, a description thereof will not be repeated.

(1) Generate Case Vector Group (Step S340)

In this processing step, a statistical model generation unit 1030 generates case vectors based on prone mesh information and supine mesh information. This processing is the same as that in step S320 of the first embodiment. However, in this embodiment, case vectors are generated by arranging position coordinate values of nodes of prone and supine meshes of a breast of each case unlike in the first embodiment. In this embodiment, since the numbers of nodes of prone and supine meshes are respectively M, and respective position coordinates correspond to three-dimensional vectors, a prone case vector $x_{prone,i}$ of 3×M dimensions and a supine case vector $x_{supine,i}$ of 3×M dimensions are respectively generated as case vectors. Note that suffix i is an index of a breast of case data, and in this embodiment which handles N case data, i has a range of 1≤i≤N.

(2) Derive Statistical Model (Step S350)

In this processing step, the statistical model generation unit 1030 statistically analyzes the prone case vector groups $x_{prone,i}$ and supine case vector groups $x_{supine,i}$ (step S340), thereby deriving a statistical model. A practical example of derivation of the statistical model will be described below.

Initially, the statistical model generation unit 1030 executes principal component analysis in association with the prone case vector groups $x_{prone,i}$ to calculate a prone mean vector $x_{paverage}$ and prone principal component vectors $e_{pd}$ (1≤d≤$D_p$) where $D_p$ is the number of principal components to be calculated by the principal component analysis and is decided by, for example, a method of providing a threshold to a cumulative contribution ratio, a method of using a fixed value, or the like. Furthermore, the statistical model generation unit 1030 calculates prone primary coefficient vectors $c_{p,i}$ of the case data by executing a calculation given by:

$$c_{p,i}=E_p^T(x_{prone,i}-x_{paverage}) \quad (13)$$

where $E_p$ is a matrix obtained by arranging the prone principal component vectors, that is, $E_p=\{e_{p,1}, e_{p,Dp}\}$, and this matrix will be referred to as a prone principal component matrix hereinafter.

Next, the statistical model generation unit 1030 executes principal component analysis in association with the supine case vector groups $x_{supine,i}$ to calculate a supine mean vector $x_{saverage}$ and supine principal component vectors $e_{sd}$ (1≤d≤$D_s$) where $D_s$ is the number of principal components to be calculated by the principal component analysis and is decided by, for example, a method of providing a threshold to a cumulative contribution ratio, a method of using a fixed value, or the like. Furthermore, the statistical model generation unit 1030 calculates supine primary coefficient vectors $c_{s,i}$ of the case data by executing a calculation given by:

$$c_{s,i}=E_s^T(x_{supine,i}-x_{saverage}) \quad (14)$$

where $E_s$ is a matrix obtained by arranging the supine principal component vectors, that is, $E_s=\{e_{s,1}, e_{s,2}, \ldots, e_{s,Ds}\}$, and this matrix will be referred to as a supine principal component matrix hereinafter.

Next, the statistical model generation unit 1030 generates combined primary coefficient vectors $c_{a,i}$ by arranging the prone and supine primary coefficient vectors, as described by:

$$c_{a,i} = \begin{pmatrix} c_{p,i} \\ c_{s,i} \end{pmatrix} \quad (15)$$

Then, the statistical model generation unit 1030 executes principal component analysis of the N combined primary coefficient vectors $c_{a,i}$ generated for the N case data to calculate a mean vector $c_{aaverage}$ and principal component vectors $e_{ad}$ (1≤d≤$D_a$). Note that this $c_{aaverage}$ will be referred to as a secondary mean vector hereinafter, and $e_{ad}$ will be referred to as a secondary principal component vector hereinafter. Also, $D_a$ is the number of principal components to be calculated by the principal component analysis and is decided by, for example, a method of providing a threshold to a cumulative contribution ratio, a method of using a fixed value, or the like.

Furthermore, the statistical model generation unit 1030 calculates secondary coefficient vectors $c_{a2,i}$ of the respective case data by executing, respectively for the N case data, a calculation given by:

$$c_{a2,i}=E_a^T(c_{a,i}-c_{aaverage}) \quad (16)$$

where $E_a$ is a matrix obtained by arranging the combined secondary principal component vectors, that is, $E_a=\{e_{a,1}, e_{a,2}, \ldots, e_{a,Da}\}$, and this matrix will be referred to as a secondary principal component matrix hereinafter.

Statistical models to be derived in this processing step are models required to generate prone and supine meshes based on the secondary coefficient vectors, and practical generation processes of these models are to execute, in turn, calculations given by:

$$\begin{pmatrix} c_p \\ c_s \end{pmatrix} = c_a = c_{aaverage} + E_a c_{a2} \quad (17)$$

$$x_{prone} \cong x_{paverage} + E_p c_p \quad (18)$$

$$x_{supine} \cong x_{saverage} + E_s c_s \quad (19)$$

That is, by calculating the right-handed side of equation (17), $c_p$ and $c_s$ as left-handed side values are calculated, and right-handed side values of expressions (18) and (19) are calculated based on these values, thereby calculating $x_{prone}$ and $x_{supine}$ as left-handed side values.

More specifically, statistical models to be derived in this processing step are $C_{aaverage}$, $E_a$, $x_{paverage}$, $E_p$, $x_{saverage}$, and $E_s$ in expressions (17) to (19). In this case, when $x_{paverage}$ and $E_p$ are to be referred to as first statistical models, $x_{saverage}$ and $E_s$ are to be referred to as second statistical models, and $c_{aaverage}$ and $E_a$ are to be referred to as third statistical models, the first and second statistical models are calculated from equations (13) and (14), and the third statistical models are calculated from equation (16) using the combined coefficient vectors in these statistical models, as can be seen from the above description. In this processing step, the statistical model generation unit 1030 records these statistical models in a main memory 212.

Next, deformation estimation phase processing to be executed by the processing apparatus of this embodiment will be described below with reference to FIG. 4. Note that processes of steps S400, S410, and S440 are the same as those in the first embodiment, and a description thereof will not be repeated.

(1) Calculate Optimal Coefficient (Step S420)

In this processing step, a deformation coefficient calculation unit 1120 executes the same processing as in step S420 of the first embodiment. Note that of deformation coefficients, a coefficient of a statistical model is $c_{a2}$ in equation (17). Also, calculations for calculating node positions of prone and supine meshes from this coefficient are executed by those given by expressions (17) to (19). That is, in the description of the processing of step S4210 of the first embodiment, a shape is calculated from statistical model variation candidates using equation (8), but the node positions of the prone and supine meshes are calculated by executing the calculations given by expressions (17) to (19) in this embodiment.

(2) Calculate Deformation Field (Step S430)

In this processing step, a transformed image generation unit 1130 executes the same processing as in step S430 of the first embodiment. In the description of step S430 of the first embodiment, node positions of prone and supine meshes are calculated by executing the calculation given by equation (10) from the statistical model coefficient calculated in step S420. However, in this embodiment, these node positions are calculated by executing the calculations given by expressions (17) to (19) instead.

By the aforementioned methods, the processing of the processing apparatus of the fourth embodiment is executed. In this embodiment, as statistical models to be derived in the learning phase processing, individual statistical models related to prone and supine positions of the case data are derived, and statistical models are then derived as models which describe their relationships of these models. Then, upon deriving individual statistical models of prone and supine positions, the different numbers of principal components can be set in respective models. Therefore, according to the statistical characteristics of the case data, the numbers of principal components can be defined in more detail. For this reason, the deformation estimation precision and calculation efficiency can be improved.

(Modification 4-1)

This embodiment has exemplified the case in which statistical models are generated based on node positions of prone and supine meshes of the case data. However, the present invention is not limited to such specific embodiment. For example, statistical models may be based on intensity values of prone and supine images of case data. An example of this case will be described below.

For example, as case vector groups generated in step S340 of this embodiment, prone case image vectors (first intensity vectors) $x_{prone\_img,i}$ and supine case image vectors (second intensity vectors) $x_{supine\_img,i}$ are also generated in addition to the prone case vectors $x_{prone,i}$ and supine case vectors $x_{supine,i}$ described in the aforementioned embodiment. Note that the prone case image vector can be a mean intensity value of the prone image in regions inside a plurality of mesh elements of the prone mesh generated in step S320. In this embodiment in which the number of mesh element is 256, $x_{prone\_img,i}$ is a 256-dimensional vector. Likewise, the supine case image vector can be a mean intensity value of the supine image in regions inside a plurality of mesh elements of the supine mesh generated in step S330, and $x_{supine\_img,i}$ is also a 256-dimensional vector. The case image vectors described above are generated and recorded.

Then, in step S350, in addition to processing for calculating mean vectors, principal component matrices, and primary coefficient vectors corresponding to the prone and supine case vectors, the following processing is executed. That is, mean vectors, principal component matrices, and primary coefficient vectors are similarly calculated in association with the aforementioned prone and supine case image vectors. In this case, let $x_{paverage\_img}$ be a mean vector associated with the prone case image vector, $e_{p\_img}$ be a principal component matrix, and $c_{p\_img,i}$ be a primary coefficient vector. Also, let $xs_{average\_img}$ be a mean vector associated with the supine case image vector, $e_{s\_img}$ be a principal component matrix, and $c_{s\_img,i}$ be a primary coefficient vector. Then, combined primary coefficient vectors described using equation (15) are generated, as described by:

$$c_{a,i} = \begin{pmatrix} c_{p,i} \\ c_{s,i} \\ c_{p\_img,i} \\ c_{s\_img,i} \end{pmatrix} \quad (20)$$

Then, as in the processing of step S350 of the fourth embodiment, principal component analysis is executed for the primary coefficient vectors to calculate a secondary mean vector $c_{aaverage}$ and secondary principal component vectors $e_{ad}$ ($1 \le d \le D_a$). Also, the secondary coefficient vectors $c_{a2,i}$ of the respective case data can be calculated using equation (16) described in the fourth embodiment.

On the other hand, in this modification, the relationship between coefficients of the statistical models and information expressed by the statistical models described using expressions (17) to (19) in the fourth embodiment are as described by:

$$\begin{pmatrix} c_{p,i} \\ c_{s,i} \\ c_{p\_img,i} \\ c_{s\_img,i} \end{pmatrix} = c_a = c_{aaverage} + E_a c_{a2} \quad (21)$$

$$x_{prone} \cong x_{paverage} + E_p c_p \quad (22)$$

$$x_{supine} \cong x_{saverage} + E_s c_s \quad (23)$$

$$x_{prone\_img} \cong x_{paverage\_img} + E_{p\_img} c_{p\_img} \quad (24)$$

$$x_{supine\_img} \cong x_{saverage\_img} + E_{s\_img} c_{s\_img} \quad (25)$$

Also, in correspondence with the statistical models described in the fourth embodiment, $x_{paverage}$ and $E_p$ will be referred to as first statistical models hereinafter, $x_{saverage}$ and $E_s$ will be referred to as second statistical models hereinafter, $C_{aaverage}$ and $E_a$ will be referred to as third statistical models hereinafter, $x_{paverage\_img}$ and $E_{p\_img}$ will be referred to as fourth statistical models hereinafter, and $x_{saverage\_img}$ and $E_{s\_img}$ will be referred to as fifth statistical models hereinafter. In this processing step, these statistical models are recorded in the main memory 212.

That is, the statistical models of the fourth embodiment express node positions of prone and supine meshes based on their coefficients, while the statistical models of this modification also express intensity values (mean intensity values in mesh elements) of prone and supine images in addition to them. With the aforementioned method, the processing of step S350 is executed.

In step S420 as a part of the deformation estimation phase processing, in addition to information related to node positions of meshes expressed by the statistical models, coefficients and rigid-body transformation of the statistical models are calculated also using the aforementioned information of the intensity values of the images. That is, similarities between intensity values of prone and supine images of the target case obtained in step S400 and those of the images expressed by the statistical models are added to the evaluation value calculation described using equation (9). In this manner, deformation coefficients can be optimized based on not only the prone and supine body surface shapes and nipple positions of the target case but also the intensity values of the images.

According to the aforementioned modification of this embodiment, the statistical models are derived based on not only breast shapes of the case data but also the intensity values of images obtained by capturing interiors of the breasts. For this reason, differences of mammary gland structures, fat quantities, and the like inside breasts appear as intensity values of images, and statistical models are derived in consideration of characteristics having relations (for example, correlations) with breast deformations. In this manner, the deformation estimation can be executed based on not only geometric characteristics such as a breast shape but also intensity values of images inside the breast from images of the target case. Thus, the deformation estimation can be executed with higher precision.

The above description has exemplified the case in which statistical models are generated using vectors including, as element values, mean intensity values of images in regions in prone and supine mesh elements. However, the present invention is not limited to such specific embodiment. For example, the interior of each mesh element may be further segmented into small regions, and mean intensity values of images in the interior region may be used for respective small regions. In this case, since statistical models which reflect intensity values of images of respective cases in more detail can be built, the deformation estimation can be executed with further higher precision.

(Modification 4-2)

This embodiment has exemplified the case in which statistical models are generated based on node positions of prone and supine meshes of case data. However, the present invention is not limited to such specific embodiment. For example, statistical models may be based on clinical information related to cases of case data. An example of this modification will be described below.

For example, in step S300 of this embodiment, clinical information of cases is obtained in addition to prone and supine images of a plurality of cases as case data. Note that the clinical information includes, for example, an age, body height, body weight, degree of obesity, BMI, race, health history, and the like.

Then, as case vector groups to be generated in step S340, case clinical information vectors $x_{info,i}$ of cases of case data are also generated in addition to prone case vectors $x_{prone,i}$ and supine case vectors $x_{supine,i}$ described in the above embodiment. Note that the case clinical information vector is obtained by converting the clinical information obtained in step S300 into numeric data. That is, the case clinical information vector is obtained by arranging numeric values of, for example, an age, body height, body weight, degree of obesity, BMI, and the like as the clinical information. Note that these items desirably undergo appropriate processing such as normalization by checking their distributions in respective case data in advance. Also, information such as a race or health history, which is originally not numeric value information, may be mapped (labeled) on numeric value information, or may be transformed into a multi-dimensional vector to approach a linear or monotonic relationship with a breast deformation or the like.

Then, in step S350, in addition to the processing for calculating mean vectors, principal component vectors, and primary coefficient vectors corresponding to prone and supine case vectors described in this embodiment, the following processing is executed. That is, a mean vector, principal component matrix, and primary coefficient vectors are similarly calculated for the case clinical information vectors. In this case, let $x_{average\_info}$ be a mean vector related to the case clinical information vectors, $E_{info}$ be a principal component matrix, and $c_{info,i}$ be primary coefficient vectors. Then, combined primary coefficient vectors described using equation (15) are generated, as described by:

$$c_{a,i} = \begin{pmatrix} c_{p,i} \\ c_{s,i} \\ c_{inf\,o,i} \end{pmatrix} \tag{26}$$

As in the processing of step S350 of the fourth embodiment, principal component analysis is executed for the primary coefficient vectors to calculate a secondary mean vector $c_{aaverage}$ and secondary principal component vectors $e_{ad}$ ($1 \le d \le D_a$). Also, secondary coefficient vectors $c_{a2,i}$ of the respective case data can be calculated using equation (16) described in the fourth embodiment.

In this modification, relationships between coefficients of statistical models and information expressed by the statistical models, which have been described using expressions (17) to (19) in the fourth embodiment, are described by:

$$\begin{pmatrix} c_{p,i} \\ c_{s,i} \\ c_{inf\,o,i} \end{pmatrix} = c_a = c_{aaverage} + E_a c_{a2} \tag{27}$$

$$x_{prone} \cong x_{paverage} + E_p c_p \tag{28}$$

$$x_{supine} \cong x_{saverage} + E_s c_s \tag{29}$$

$$x_{inf\,o} \cong x_{paverage\_inf\,o} + E_{inf\,o} c_{inf\,o} \tag{30}$$

That is, the statistical models in the fourth embodiment express node positions of prone and supine meshes based on their coefficients, while those in this modification express clinical information in addition to the node positions. With the method described above, the processing of step S350 is executed.

On the other hand, as the deformation estimation phase processing, clinical information of the target case is also obtained in addition to the prone and supine images of the target case in step S400. Then, in step S420, a coefficient and rigid-body transformation of a statistical model are calculated using the aforementioned clinical information in addition to information related to node positions of meshes expressed by the statistical models. That is, similarities between the clinical information of the target case obtained in step S400 and that expressed by the statistical models are added to evaluation value calculations described using equation (9). Thus, a deformation coefficient can be optimized based on not only the prone and supine body surface shapes and nipple positions of the target case but also the clinical information.

According to the aforementioned modification of this embodiment, statistical models are derived based on not only breast shapes of case data but also clinical information related to a case of that case data. For this reason, statistical models can be derived in consideration of characteristics such as an age, body height, body weight, degree of obesity, BMI, race, and health history of a case of case data, which have relations (for example, correlations) with breast deformations. Thus, the deformation estimation can be executed based on not only the geometric characteristics such as the breast shapes and the like of the target case but also the clinical information. Therefore, the deformation estimation can be executed with higher precision.

Other Embodiments

Also, the object of the present invention can also be achieved when a recording medium (or storage medium) which records a program code of software that implements the functions of the aforementioned embodiment is supplied to a system or apparatus, and a computer (or a CPU or MPU) of that system or apparatus reads out and executes the program code stored in the recording medium. In this case, the program code itself read out from the recording medium implements the functions of the aforementioned embodiment, and the recording medium which records the program code configures the present invention.

The functions of the aforementioned embodiment are implemented not only when the computer executes the readout program code but also when an OS (Operating System) or the like, which runs on the computer executes some or all of actual processes based on instructions of the program code, and the functions of the aforementioned embodiment are implemented by these processes.

Furthermore, after the program code read out from the recording medium is written in a memory included in a function expansion card inserted in the computer or a function expansion unit connected to the computer, a CPU included in the function expansion card or unit executes some or all of actual processes based on instructions of the program code, thereby implementing the functions of the aforementioned embodiment.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A medical image processing apparatus comprising a memory storing a program, and one or more processors which, by executing the stored program, function as:
   an obtaining unit configured to obtain first and second data, said first data indicating a deformation from a first shape to a second shape, and said second data indicating a deformation from a third shape to a fourth shape, wherein the first and third shapes are measured in a first state, the second and fourth shapes are measured in a second state, the first shape is different than the third shape, and the second shape is different than the fourth shape; and
   a generation unit configured to generate data indicating a relationship between a shape and a deformation amount from the first state to the second state based on the first and second data,
   said one or more processors being configured to estimate a position of a corresponding area of interest of said first state in said second state using said generated data indicating said relationship between a shape and a deformation amount so as to align a plurality of medical images having different deformation states.

2. The apparatus according to claim 1, wherein the first data and the second data are a first vector and a second vector, respectively, which are obtained by arranging position coordinate values of nodes that express the respective shapes in association with an identical case, and corresponding elements of the first vector and the second vector express position coordinate values of corresponding nodes.

3. The apparatus according to claim 2, wherein said generation unit executes principal component analysis for a vector pair obtained by arranging the first vector and the second vector associated with the identical case, and generates the data indicating the relation using obtained principal components by the principal component analysis and a mean vector of the vector pair.

4. The apparatus according to claim 1, wherein said generation unit classifies the plurality of cases into a plurality of groups according to attributes of the cases, and generates the data indicating the relation for respective groups.

5. The apparatus according to claim 3, wherein said generation unit executes principal component analysis using the different numbers of principal components, and generates the data indicating the relation for the respective numbers of principal components.

6. The apparatus according to claim 1, wherein said obtaining unit extracts first corresponding points from a medical image obtained in a case of the first shape and a medical image obtained in a case of the second shape, and obtains the first data based on a position of the first corresponding points, and extracts second corresponding points from a medical image obtained in a case of the third shape and a medical image obtained in a case of the fourth shape, and obtains the second data based on a position of the second corresponding points.

7. The apparatus according to claim 1, wherein in a case where the first data and the second data have symmetry, said obtaining unit symmetrically transforms one data to obtain the other data.

8. The apparatus according to claim 1, wherein said obtaining unit extracts first corresponding points from a medical image obtained in a case of the first shape and a medical image obtained in a case of the second shape by a user's input operation, and obtains the first data based on positions of the first corresponding points, and extracts second corresponding points from a medical image obtained in a case of the third shape and a medical image obtained in a case of the fourth shape by a user's input operation, and obtains the second data based on positions of the second corresponding points.

9. The apparatus according to claim 2, wherein as the data indicating the relation,
   said generation unit executes principal component analysis of a plurality of the first vectors obtained from the plurality of cases and generates data indicating a first relation from obtained principal components by the principal component analysis and a mean vector of the first vectors, said generation unit executes principal component analysis of a plurality of the second vectors obtained from the plurality of cases and generates data indicating a second relation from obtained principal components by the principal component analysis and a mean vector of the second vectors, and said generation unit generates data indicating a third relation by executing principal component analysis of vectors obtained by combination coefficients of the data indicating the first relation model and the data indicating the second relation.

10. The apparatus according to claim 1, wherein the first state is a prone state, and the second state is a supine state.

11. The apparatus according to claim 1, wherein the first data is medical images captured in the first state and the second state in a first case, and the second data is medical images captured in the first state and the second state in a second case different from the first case.

12. A medical image processing apparatus comprising a memory storing a program, and one or more processors which, by executing the stored program, function as:
    an obtaining unit configured to obtain a first medical image in a first state; and
    an estimation unit configured to estimate information on a deformation from the first medical image in the first state into a second medical image in a second state on the basis of data indicating a relationship between a shape and a deformation amount from the first state to the second state, the data being generated based on first and second data, said first data indicating a deformation from a first shape to a second shape, and said second data indicating a deformation from a third shape to a fourth shape, wherein the first and third shapes are measured in the first state, the second and fourth shapes are measured in the second state, the first shape is different than the third shape, and the second shape is different than the fourth shape,
    said one or more processors estimate a position of a corresponding area of interest of said first state in said second state using said generated data indicating said relationship between a shape and a deformation amount so as to align a plurality of medical images having different deformation states.

13. The apparatus according to claim 12, further comprising a display controlling unit, wherein
    the obtaining unit is configured to obtain a third medical image in a second state; and
    the display controlling unit is configured to cause a display unit to display an image including the second medical image in the second state and the third medical image in the second state.

14. The apparatus according to claim 13, wherein the first medical image is an image captured by a first modality and the third medical image is an image captured by a second modality different from the first modality.

15. The apparatus according to claim 12, wherein the first medical image is any one of an ultrasonic image, a MRI image, a X-ray CT image, and a PET image.

16. The apparatus according to claim 12, wherein the first state is a prone state, and the second state is a supine state.

17. The apparatus according to claim 12, wherein the obtaining unit is configured to obtain the first medical image from a data server configured to hold the first medical image.

18. The apparatus according to claim 12, wherein the first data is medical images captured in the first state and the second state in a first case, and the second data is medical images captured in the first state and the second state in a second case different from the first case.

19. The apparatus according to claim 12, further comprising a display controlling unit configured to cause a display unit to display the second medical image in the second state.

20. The apparatus according to claim 12, wherein the estimation unit is configured to select the data from among a plurality of data corresponding to a plurality of attributes of cases, each of the plurality of data indicating a relation between a shape and a deformation from the first state to the second state in each of the plurality of attributes of cases.

21. The apparatus according to claim 20, wherein the estimation unit is configured to obtain information on an attribute of a case corresponding to the first medical image, and
    select the data corresponding to the attribute of the case from among the plurality of data on the basis of the information on the attribute of the case.

22. An image processing apparatus comprising a memory storing a program, and one or more processors which, by executing the stored program, function as:
    an obtaining unit configured to obtain a first image in a first state; and
    an estimation unit configured to estimate information on a deformation from the first image in the first state into a second image in a second state on the basis of data indicating a relationship between a shape and a deformation amount from the first state to the second state, the data being generated based on a plurality of data each of which indicates a different deformation from a shape measured in a first state to a shape measured in a second state, wherein the respective shapes measured in the first state are different from each other, and the respective shapes measured in the second state are different from each other,
    said one or more processors estimate a position of a corresponding area of interest of said first state in said second state using said generated data indicating said relationship between a shape and a deformation amount so as to align a plurality of medical images having different deformation states.

* * * * *